(12) United States Patent
Kita et al.

(10) Patent No.: US 12,078,867 B2
(45) Date of Patent: Sep. 3, 2024

(54) FOCUS DETECTION DEVICE, IMAGE SENSOR, AND INTERCHANGEABLE LENS

(71) Applicant: NIKON CORPORATION, Tokyo (JP)

(72) Inventors: Yuki Kita, Kawasaki (JP); Akira Kinoshita, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 18/210,274

(22) Filed: Jun. 15, 2023

(65) Prior Publication Data
US 2023/0324650 A1 Oct. 12, 2023

Related U.S. Application Data

(62) Division of application No. 17/261,974, filed as application No. PCT/JP2019/028476 on Jul. 19, 2019, now Pat. No. 11,714,259.

(30) Foreign Application Priority Data

Jul. 20, 2018 (JP) ................. 2018-137262

(51) Int. Cl.
G02B 7/34 (2021.01)
H04N 23/67 (2023.01)

(52) U.S. Cl.
CPC ............. G02B 7/34 (2013.01); H04N 23/67 (2023.01)

(58) Field of Classification Search
CPC . G02B 7/34; G02B 7/346; G02B 7/38; G02B 7/36; H04N 23/67; H04N 23/663; H04N 23/672; H04N 25/704; H04N 25/134; H04N 23/673; H04N 23/675; H04N 25/61; H04N 23/667; H04N 23/687; H04N 25/60; H04N 25/75; H04N 25/778; H04N 23/00;
(Continued)

(56) References Cited

U.S. PATENT DOCUMENTS 9,967,450 B2 5/2018 Takahara
2009/0015704 A1 1/2009 Namai et al.
(Continued)

FOREIGN PATENT DOCUMENTS

EP 2 169 459 A2 3/2010
EP 249 192 A1 11/2010
(Continued)

OTHER PUBLICATIONS

Aug. 22, 2023 Office Action issued in Japanese Patent Application No. 2022-138985.
(Continued)

Primary Examiner — Michael S Osinski
(74) Attorney, Agent, or Firm — Oliff PLC

(57) ABSTRACT

A focus detection device includes: an imaging unit having a first pixel and a second pixel each of which receives light transmitted through an optical system and outputs signal used for focus detection; an input unit to which first information regarding a position on an image plane and an exit pupil distance of the optical system is input; a selection unit that selects a first focus detection based on the signal having been output from the first pixel or a second focus detection based on the signal having been output from the second pixel, based on the first information having been input to the input unit; and a focus detection unit that performs the first focus detection or the second focus detection based on a selection by the selection unit.

32 Claims, 23 Drawing Sheets

(58) Field of Classification Search
CPC ........ H04N 23/55; H04N 23/63; G03B 13/36; G03B 17/14; G03B 3/10; G03B 13/34
See application file for complete search history.

(56) References Cited

U.S. PATENT DOCUMENTS

| | | |
|---|---|---|
| 2009/0128671 A1 | 5/2009 | Kusaka |
| 2010/0045849 A1 | 2/2010 | Yamasaki |
| 2011/0063484 A1 | 3/2011 | Fujii et al. |
| 2011/0205423 A1 | 8/2011 | Tsukada |
| 2011/0228163 A1 | 9/2011 | Isaka et al. |
| 2012/0147227 A1 | 6/2012 | Yoshimura et al. |
| 2012/0300104 A1 | 11/2012 | Onuki et al. |
| 2014/0022439 A1 | 1/2014 | Aoki |
| 2015/0002838 A1 | 1/2015 | Fukuda et al. |
| 2015/0281556 A1 | 10/2015 | Hamano |
| 2016/0191787 A1 | 6/2016 | Inagaki |
| 2016/0349522 A1 | 12/2016 | Onuki et al. |
| 2017/0257587 A1 | 9/2017 | Hatano et al. |
| 2017/0310913 A1 | 10/2017 | Takada et al. |
| 2017/0332003 A1 | 11/2017 | Hamano et al. |
| 2017/0357185 A1 | 12/2017 | Nagashima et al. |
| 2018/0077341 A1 | 3/2018 | Kurisu |
| 2018/0176455 A1 | 6/2018 | Kikuchi et al. |
| 2019/0007599 A1 | 1/2019 | Takahara |
| 2019/0075246 A1 | 3/2019 | Kanda |
| 2019/0158744 A1 | 5/2019 | Saito |
| 2019/0191100 A1 | 6/2019 | Nakamura |
| 2019/0394407 A1 | 12/2019 | Fukuda et al. |
| 2020/0092489 A1 | 3/2020 | Inagaki |
| 2020/0244893 A1 | 7/2020 | Fujii |
| 2020/0404156 A1 | 12/2020 | Aoki |
| 2021/0006708 A1 | 1/2021 | Wada et al. |
| 2022/0116532 A1 | 4/2022 | Sambongi et al. |
| 2022/0187686 A1 | 6/2022 | Kita et al. |

FOREIGN PATENT DOCUMENTS

| | | |
|---|---|---|
| EP | 1911269 B1 | 5/2012 |
| JP | S63-286811 A | 11/1988 |
| JP | 2007-053742 A | 3/2007 |
| JP | 2009-204987 A | 9/2009 |
| JP | 2010-049209 A | 3/2010 |
| JP | 2011-217368 A | 10/2011 |
| JP | 2017-219719 A | 12/2017 |
| JP | 2017-219791 A | 12/2017 |
| WO | 2007/011002 A1 | 1/2007 |

OTHER PUBLICATIONS

Oct. 21, 2019 International Search Report issued in International Patent Application No. PCT/JP2019/028476.
Oct. 21, 2019 Written Opinion issued in International Patent Application No. PCT/JP2019/028476.
Jan. 4, 2022 Office Action issued in Japanese Patent Application No. 2020-531388.
May 26, 2022 Office Action issued in Chinese Patent Application No. 201980060853.5.
Jan. 31, 2023 Office Action Issued In U.S. Appl. No. 17/261,974.
Mar. 15, 2023 Notice Of Allowance issued in U.S. Appl. No. 17/261,974.
Feb. 23, 2023 Office Action issued in Chinese Patent Application No. 201980060853.5.
Mar. 31, 2023 Corrected Notice of Allowability issued in U.S. Appl. No. 17/261,974.

| POSITION ZONE OF FOCUSING LENS | Z1 | Z2 | ... | Zn |
|---|---|---|---|---|
| CONSTANT TERM Co | Poz1 | Poz2 | ... | Pozn |
| COEFFICIENT h4 | h4z1 | h4z2 | ... | h4zn |
| COEFFICIENT h2 | h2z1 | h2z2 | ... | h2zn |

FIG. 12

| ZONE | W1 | W2 | ... | Wn |
|---|---|---|---|---|
| CONSTANT TERM Co | Pow1 | Pow2 | ... | Pown |
| COEFFICIENT h4 | h4w1 | h4w2 | ... | h4wn |
| COEFFICIENT h2 | h2w1 | h2w2 | ... | h2wn |

(a)

(b)

(c)

(a)  (b)  (c)

FOCUS DETECTION DEVICE, IMAGE SENSOR, AND INTERCHANGEABLE LENS

RELATED APPLICATIONS

This application is a divisional application of U.S. patent application Ser. No. 17/261,974, filed Jul. 16, 2021, which is a national stage entry of PCT/JP2019/028476, filed Jul. 19, 2019, which in turn claims priority to Japanese Patent Application No. 2018-137262, filed Jul. 20, 2018. The contents of those prior applications are hereby incorporated by reference herein in their entireties.

TECHNICAL FIELD

The present invention relates to a focus detection device, an imaging device, and an interchangeable lens.

BACKGROUND ART

There is known an imaging device that performs focus detection by selecting an AF pixel pair according to the exit pupil position of a lens among a plurality of types of AF pixel pairs (Patent Literature 1: PTL1). Conventionally, improvement in focus detection accuracy has been required.

CITATION LIST

Patent Literature

PTL 1: Japanese Laid-Open Patent Publication No. 2009-204987

SUMMARY OF INVENTION

According to the 1st aspect of the invention, a focus detection device comprises: an imaging unit having a first pixel and a second pixel each of which receives light transmitted through an optical system and outputs signal used for focus detection; an input unit to which first information regarding a position on an image plane and an exit pupil distance of the optical system is input; a selection unit that selects a first focus detection based on the signal having been output from the first pixel or a second focus detection based on the signal having been output from the second pixel, based on the first information having been input to the input unit; and a focus detection unit that performs the first focus detection or the second focus detection based on a selection by the selection unit.

According to the 2nd aspect of the invention, an imaging device comprises: the focus detection device according to the 1st aspect; and a detachable portion that enables to attach and detach an interchangeable lens having the optical system; and wherein: the input unit is for being input the first information from the interchangeable lens attached to the detachable portion.

According to the 3rd aspect of the present invention, an interchangeable lens that can be attached to and detached from a camera that has an imaging unit, comprises: an optical system in which an exit pupil distance changes depending on a position on the image plane of the imaging unit; and an output unit that outputs first information regarding the position on the image plane and the exit pupil distance to the camera.

BRIEF DESCRIPTION OF DRAWINGS

FIG. 11 is a table showing a constant term and coefficients of a function that approximates representative optical characteristic curve in each focus position zone in the imaging device according to the first embodiment.

FIG. 12 is a table showing a constant term and coefficients of a function that approximates representative optical characteristic curve in each zone in the imaging device according to the first embodiment.

DESCRIPTION OF EMBODIMENTS

First Embodiment

Figure 1:
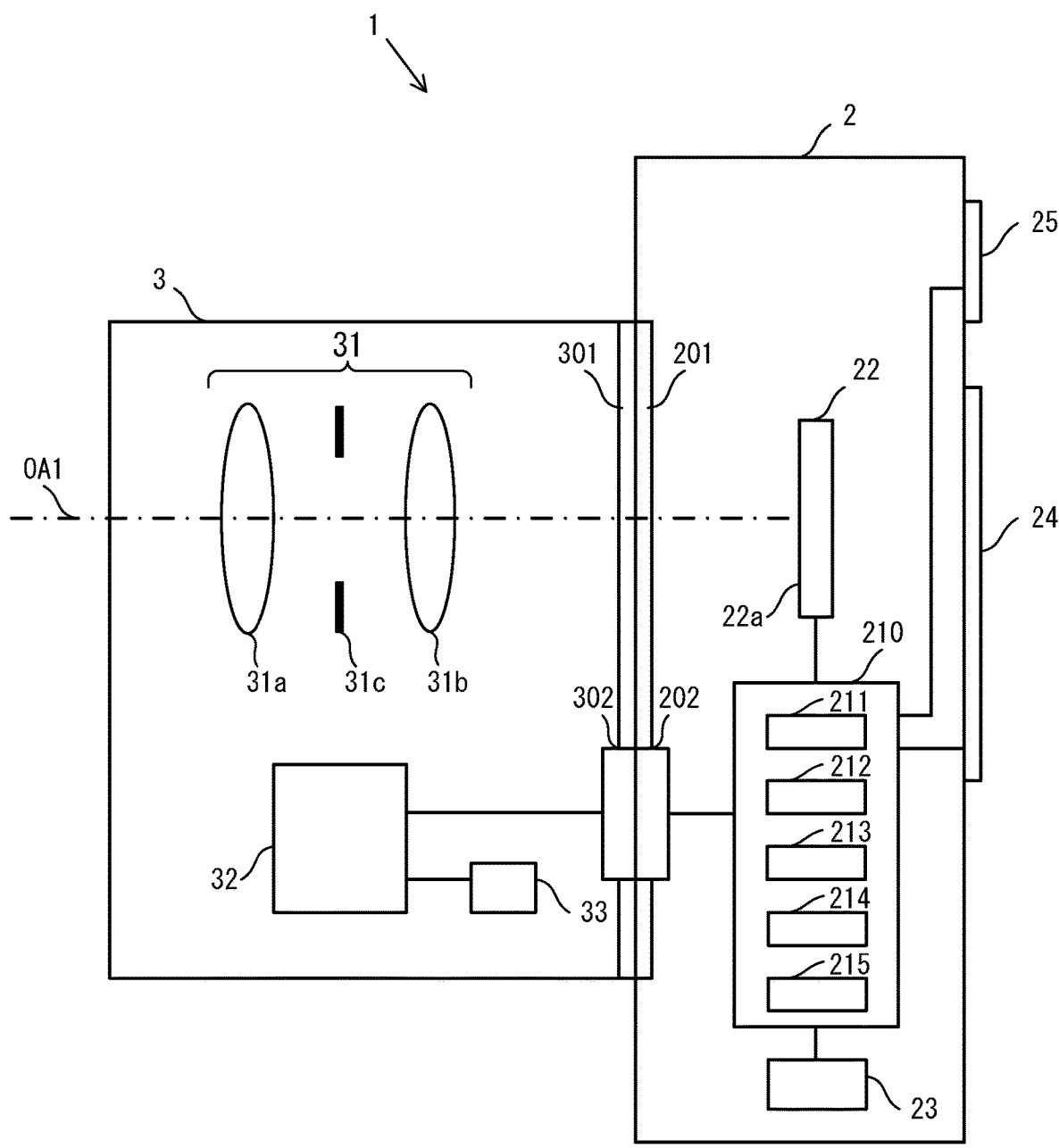
FIG. 1 is a diagram showing a configuration example of an imaging device according to the first embodiment.

FIG. 1 is a diagram showing a configuration example of an electronic camera 1 (hereinafter, referred to as a camera 1) which is an example of an imaging device according to the first embodiment. The camera 1 is configured with a camera body 2 and an interchangeable lens 3. Since the camera 1 is configured with the camera body 2 and the interchangeable lens 3, it is sometimes called a camera system.

The camera body 2 is provided with a body-side mount unit 201 to which the interchangeable lens 3 is to be attached. The interchangeable lens 3 is provided with a lens-side mount unit 301 that is to be attached to the camera body 2. The lens-side mount unit 301 and the body-side mount unit 201 are provided with a lens-side connection portion 302 and a body-side connection portion 202, respectively. The lens-side connection portion 302 and the body-side connection portion 202 are each provided with a plurality of terminals such as a terminal for a clock signal, a terminal for a data signal, and a terminal for supplying power. The interchangeable lens 3 is to be detachably attached to the camera body 2 by the lens-side mount unit 301 and the body-side mount unit 201.

Upon being attached the interchangeable lens 3 to the camera body 2, the terminal provided on the body-side connection portion 202 and the terminal provided on the lens-side connection portion 302 are electrically connected. Thereby, it becomes to be possible to supply power from the camera body 2 to the interchangeable lens 3 or to communicate between the camera body 2 and the interchangeable lens 3.

The interchangeable lens 3 includes a photographing optical system (imaging optical system) 31, a lens control unit 32, and a lens memory 33. The photographing optical system 31 includes, a plurality of lenses including a zoom lens (variable magnification lens) 31a for changing the focal length and a focusing lens (focus adjustment lens) 31b, and an aperture 31c, and forms a subject image on the imaging surface 22a of the image sensor 22. Although the zoom lens 31a and the focusing lens 31b are schematically shown in FIG. 1, a common photographing optical system is generally configured with a lot of optical elements.

Further, as will be described later, the photographing optical system 31 of the interchangeable lens 3 has an optical characteristic that the position of the exit pupil thereof, that is, the exit pupil distance changes depending on the image height. In other words, the exit pupil distance of the photographing optical system 31 changes depending on the position on the imaging surface 22a, that is, the distance from the optical axis OA1 of the photographing optical system 31 on the imaging surface 22a. The optical axis OA1 of the photographing optical system 31 intersects the imaging surface 22a at the center position of the imaging surface 22a. Here, the exit pupil distance is the distance between the exit pupil of the photographing optical system 31 and the image plane of the image by the photographing optical system 31. It is to be noted, the imaging surface 22a of the image sensor 22 is, for example, a surface on which a photoelectric conversion unit described later is arranged or a surface on which a microlenses are arranged.

Moreover, the photographing optical system 31 differs depending on the type of the interchangeable lens 3 to be mounted on the body-side mount unit 201. Therefore, the exit pupil distance of the photographing optical system 31 differs depending on the type of the interchangeable lens 3. Further, the optical characteristics in which the exit pupil distance changes depending on the image height, also differ depending on the type of the interchangeable lens 3.

The lens control unit 32 is configured with a processor such as a CPU, FPGA, and ASIC, and a memory such as ROM and RAM, and controls each part of the interchangeable lens 3 based on a control program. The lens control unit 32 controls the position of the zoom lens 31a, the position of the focusing lens 31b, and the drive of the aperture 31c based on the signal output from a body control unit 210 of the camera body 2. Upon being input a signal indicating moving direction, movement amount or the like of the focusing lens 31b from the body control unit 210, the lens control unit 32 moves the focusing lens 31b forward or backward in the optical axis OA1 direction based on the signal, to adjust the focal position of the photographing optical system 31. Further, the lens control unit 32 controls the position of the zoom lens 31a and/or the aperture diameter of the aperture 31c based on the signal output from the body control unit 210 of the camera body 2.

The lens memory 33 is configured with, for example, a non-volatile storage medium or the like. Information related to the interchangeable lens 3 is stored (recorded) as lens information in the lens memory 33. The lens information includes data on the optical characteristics (the exit pupil distance and/or an F-number) of the photographing optical system 31, data on the infinity position and the closest position of the focusing lens 31b, and data on the shortest focal length and the longest focal length of the interchangeable lens 3. The optical characteristics of the photographing optical system 31 include the exit pupil distance, the F value (aperture value of the aperture 31c), and the like. It is to be noted that the lens information differs depending on the type of the interchangeable lens 3. The lens information may be stored in the internal memory of the lens control unit 32. Further, the lens information may be stored in the body memory 23 in the camera body 2 described later. In this case, the body memory 23 stores the lens information of the plurality of types of interchangeable lenses 3.

In the present embodiment, the lens information includes information regarding the exit pupil distance of the photographing optical system 31. Although regarding the information with respect to the exit pupil distance will be described later, it includes the information indicating the exit pupil distance (Co) at the position where the imaging surface 22a and the optical axis OA1 intersect (the position where the image height is zero) and the information on coefficients (h4, h2) of the calculation formula showing the relationship between the exit pupil distance and the image height. The writing of data to the lens memory 33 and the reading of data from the lens memory 33 are controlled by the lens control unit 32. Upon being attached the interchangeable lens 3 to the camera body 2, the lens control unit 32 transmits the lens information to the body control unit 210 via the terminals of the lens-side connection portion 302 and the body-side connection portion 202. Further, the lens control unit 32 transmits position information (focal length information) of the zoom lens 31a being controlled, position information of the focusing lens 31b being controlled, information of the F-number of the aperture 31c being controlled, and the like to the body control unit 210.

In the present embodiment, the lens control unit 32 functions as an output unit that transmits information regarding the exit pupil distance of the photographing optical system 31 to the camera body 2. The body control unit 210 functions as an input unit being input information, from the interchangeable lens 3, regarding the exit pupil distance of the photographing optical system 31.

The lens control unit 32 performs bidirectional communication between the camera body 2 and the interchangeable lens 3 via the terminals of the lens-side connection portion 302 and the body-side connection portion 202. Upon being input a signal requesting transmission of information (h4, h2, Co) regarding the exit pupil distance from the camera body 2, the lens control unit 32 transmits the information regarding the exit pupil distance to the camera body 2. It is to be noted that the information regarding the exit pupil distance differs depending on the type of the interchangeable lens 3. Further, the lens control unit 32 may transmit information regarding the exit pupil distance to the camera body 2 each time the image sensor 22 performs an image capturing. The lens control unit 32 may transmit information regarding the exit pupil distance to the camera body 2 in a case where the zoom lens 31a moves and the focal length of the photographing optical system 31 changes. The lens control unit 32 may transmit the information on the focal length of the photographing optical system 31 and the information on the exit pupil distance to the camera body 2 by one time bidirectional communication.

Next, the configuration of the camera body 2 will be described. The camera body 2 is provided with the image sensor 22, the body memory 23, a display unit 24, an operation unit 25, and the body control unit 210. The image sensor 22 is a CMOS image sensor, a CCD image sensor or the like. The image sensor 22 performs an image capturing of a subject image formed by the photographing optical system 31. In the image sensor 22, a plurality of pixels each having a photoelectric conversion unit are arranged in two-dimensional manner (row direction and column direction). The photoelectric conversion unit is configured with a photodiode (PD). The image sensor 22 performs photoelectric conversion of the received light by the photoelectric conversion unit to generate a signal, and outputs the generated signal to the body control unit 210.

As will be described later, the image sensor 22 has an imaging pixel that outputs a signal used for image generation and a focus detection pixel that outputs a signal used for focus detection. The imaging pixel includes a pixel (hereinafter, referred to as an R pixel) having a filter of a spectral characteristic that spectrally disperses the light having the first wavelength region (red (R) light) from the incident light, a pixel (hereinafter, referred to as a G pixel) having a filter of a spectral characteristic that spectrally disperses the light having the second wavelength region (green (G) light) from the incident light, and a pixel (hereinafter, referred to as a B pixel) having a filter of a spectral characteristic that spectrally disperses the light having the third wavelength region (blue (B) light) from the incident light. The R pixel, the G pixel, and the B pixel are arranged according to the Bayer arrangement. The focus detection pixels are arranged by replacing a part of the imaging pixels and are dispersedly arranged on substantially the entire surface of the imaging surface 22a of the image sensor 22.

The body memory 23 is configured with, for example, a non-volatile storage medium or the like. In the body memory 23, an image data, a control program, and the like are recorded. The writing of data to the body memory 23 and the reading of data from the body memory 23 are controlled by the body control unit 210. The display unit 24 displays an image based on image data, an image showing a focus detection area (an AF area) such as an AF frame, information on photographing such as a shutter speed and the F-number, a menu screen, and the like. The operation unit 25 includes various setting switches such as a release button, a power switch, and a switch for switching various modes, and outputs a signal corresponding to each operation to the body control unit 210. Further, the operation unit 25 is a setting unit capable of setting an arbitrary focus detection area among a plurality of focus detection areas, and a user can select the arbitrary focus detection area by operating the operation unit 25.

The body control unit 210 is configured with a processor such as a CPU, FPGA, and ASIC, and a memory such as ROM and RAM, and controls each part of the camera 1 based on a control program. The body control unit 210 includes an image data generation unit 211, an area setting unit 212, a distance calculation unit 213, a selection unit 214, and a focus detection unit 215. The image data generation unit 211 generates image data by performing various image processing on the signals output from the imaging pixels of the image sensor 22. It is to be noted that the image data generation unit 211 may generate image data also using signals output from the focus detection pixels.

The area setting unit 212 sets (selects) at least one focus detection area 100 among the plurality of focus detection areas 100 provided on the imaging surface 22a of the image sensor 22 shown in FIG. 2(a). The plurality of AF frames displayed on the display unit 24 correspond to the plurality of focus detection areas 100 provided on the image sensor 22, respectively. The area setting unit 212 sets, among the plurality of AF frames displayed on the display unit 24, the focus detection area 100 corresponding to the AF frame selected by the user by operating the operation unit 25, or the focus detection area 100 which is selected by the camera 1 in automatically, as the area in which the focus detection is performed. As will be described later, the focus detection unit 215 detects the deviation amount (defocus amount) between the image by the photographing optical system 31 and the imaging surface 22a using a signal output from the focus detection pixel in the focus detection area 100 set by the area setting unit 212.

As shown schematically in FIG. 2(b), in the focus detection area 100, in addition to the imaging pixels, a plurality types of pair of focus detection pixels (AF pixel pairs) are arranged. In the present embodiment, a first AF pixel pair, a second AF pixel pair, and a third AF pixel pair are arranged. The first AF pixel pair, the second AF pixel pair, and the third AF pixel pair are arranged for accurately detecting the defocus amount at the exit pupil distance that differs depending on the image height or the type of interchangeable lens. One of focus detection pixel among the AF pixel pair outputs a first signal Sig1, and the other of focus detection pixel among the AF pixel pair outputs a second signal Sig2. The first AF pixel pair, the second AF pixel pair, and the third AF pixel pair will be described later.

As shown in FIG. 2(a), the plurality of focus detection areas 100 are arranged in two-dimensional directions (row direction and column direction), and the image height differs depending on arranged position. The small region 110a (see FIG. 2(b)) in the focus detection area 100a at the center part of the imaging surface 22a is located on the optical axis OA1 of the photographing optical system 31, and the image height H here is substantially zero. As the focus detection area 100 being away from the center (optical axis OA1 of the photographing optical system 31) of the imaging surface 22a, the image height H thereat increases. In other words, as the distance from the center of the imaging surface 22a to the focus detection area 100 increases, the image height H thereat increases. Therefore, in the row where the focus detection area 100a exists, the focus detection areas 100 farthest from the optical axis OA1 of the photographing optical system 31 (the image height H is the highest) are a focus detection areas 100b and 100c located at the left end (the end in the −X direction) and the right end (the end in the +X direction). The focus detection areas 100 at which the image height H is highest in the image sensor 22 are four focus detection areas 100 at the corners of the imaging surface 22a.

Since the focus detection area 100 has a predetermined area, the image height differs for each focus detection pixel depending on the position in the focus detection area 100. That is, within the focus detection area 100, the image height at the central small region 110a (see FIG. 2(b)) is different from the image heights at the small regions 110b and 110c located at the left end (end in the −X direction) and the right end (end in the +X direction) respectively (see FIG. 2(b)). However, in the present embodiment, the value of the image height H at the center position of one focus detection area 100 is used as the value representing the image height of the entire focus detection area 100. The image height of the focus detection area 100a in the center part of the imaging surface 22a is zero, and the image heights of the focus detection areas 100b and 100c are predetermined image heights H.

The distance calculation unit 213 calculates the exit pupil distance of the photographing optical system 31 at the image height H. The distance calculation unit 213 calculates the exit pupil distance Po (H) of the photographing optical system 31 at the image height H of the focus detection area 100 set by the area setting unit 212 by the following formula (1).

$$Po(H) = h4 \times H^4 + h2 \times H^2 + Co \quad (1)$$

Formula (1) is a calculation formula with the image height H as a variable, the parameter (h4) is the coefficient of the fourth-order term of the variable H, the parameter (h2) is the coefficient of the second-order term of the variable H, and the constant term Co is the exit pupil distance at the position where the image height is zero (the position of the optical axis OA1 on the imaging surface 22a). The parameters (h4), (h2), and the constant term Co are information on the exit pupil distances corresponding to different image heights, and are values determined by the optical characteristics of the photographing optical system 31. Information indicating the parameters (h4), (h2) and the constant term Co is transmitted from the interchangeable lens 3 to the camera body 2 as lens information. The calculation formula (1) is stored in the internal memory of the body control unit 210. Based on the image height H of the focus detection area 100 set by the area setting unit 212, the lens information (h4, h2, Co), and the calculation formula (1), the distance calculation unit 213 calculates the exit pupil distance Po (H) for the image height H of the focus detection area 100 having been set. It is to be noted that the calculation formula (1) may be stored in the internal memory of the lens control unit 32. The lens control unit 32 may transmit the calculation formula (1) from the interchangeable lens 3 to the camera body 2 as lens information together with the parameters (h4), (h2) and the constant term Co.

The selection unit 214 selects, from among the plurality of types of AF pixel pairs provided in the image sensor 22, the AF pixel pair from which the first and second signals Sig1 and Sig2 is used for performing focus detection. In the present embodiment, the selection unit 214 selects any one type of a plurality of types of AF pixel pairs arranged in the focus detection area 100 set by the area setting unit 212. As will be described later, the selection unit 214 selects an AF pixel pair suitable for the exit pupil distance Po (H) calculated by the distance calculation unit 213 from among a plurality of types of AF pixel pairs. In a case that a plurality of focus detection areas 100 are set by the area setting unit 212, the selection unit 214 selects the same type of AF pixel pair in each selected focus detection area 100.

The focus detection unit 215 performs focus detection processing necessary for automatic focus adjustment (AF) of the photographing optical system 31. The focus detection unit 215 detects the focus position (movement amount of the focusing lens 31b to the focusing position) for focusing (forming) the image formed by the photographing optical system 31 on the imaging surface 22a of the image sensor 22. The focus detection unit 215 calculates the defocus amount by the pupil division type phase difference detection method using the first and second signals Sig1 and Sig2 output from the AF pixel pair selected by the selection unit 214.

The focus detection unit 215 calculates an image shift amount by performing correlation calculation with a first signal Sig1 generated by capturing an image formed of a first light flux passed through a first pupil region of the exit pupil of the photographing optical system 31 and a second signal Sig2 generated by capturing an image formed of a second light flux passed through a second pupil region of the exit pupil of the photographing optical system 31. The focus detection unit 215 converts the image shift amount into a defocus amount based on a predetermined conversion formula. The focus detection unit 215 calculates the movement amount of the focusing lens 31b to the in-focus position based on the calculated defocus amount.

The focus detection unit 215 determines whether or not the defocus amount is within the permissible value. If the defocus amount is within the permissible value, the focus detection unit 215 determines that being an in-focus state. On the other hand, if the defocus amount exceeds the permissible value, the focus detection unit 215 determines that not being in-focus state and transmits signal for instructing the movement amount and moving operation of the focusing lens 31b to the lens control unit 32 of the interchangeable lens 3. Focus adjustment is performed automatically by the lens control unit 32 moving the focusing lens 31b according to the movement amount.

Further, the focus detection unit 215 can also perform the focus detection processing by the contrast detection method in addition to the focus detection processing by the phase difference detection method. The body control unit 210 calculates the contrast evaluation value of the subject image one after another based on the signal output from the imaging pixels while moving the focusing lens 31b of the photographing optical system 31 along the optical axis OA1 direction. The body control unit 210 associates the position of the focusing lens 31b and the contrast evaluation value by using the position information of the focusing lens 31b transmitted from the interchangeable lens 3. Then, the body control unit 210 detects the position of the focusing lens 31b at which shows the peak value of the contrast evaluation value, that is, the maximum value, as the in-focus position. The body control unit 210 transmits information on the position of the focusing lens 31b corresponding to the detected focusing position to the lens control unit 32. The lens control unit 32 moves the focusing lens 31b to the in-focus position to perform the focus adjustment.

Figure 3:
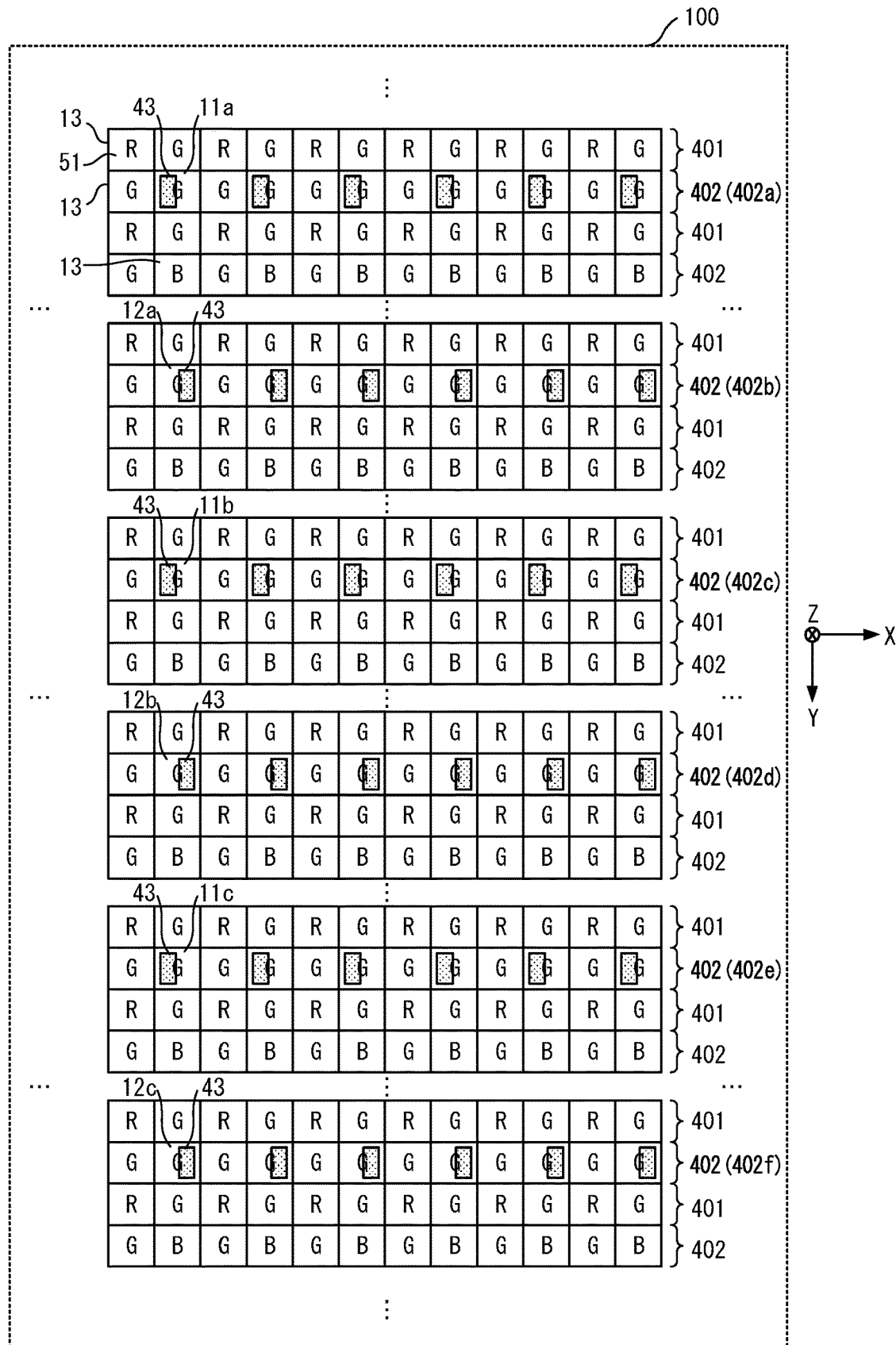
FIG. 3 is a diagram showing an arrangement example of pixels in the focus detection area of the imaging device according to the first embodiment.

FIG. 3 is a diagram showing an arrangement example of pixels in the focus detection area 100. In FIG. 3, a first pixel group 401 in which the R pixels 13 and the G pixels 13 are alternately arranged in the ±X direction, that is, the row direction, and a second pixel group 402 in which the G pixels 13 and the B pixels 13 are alternately arranged in the row direction, are alternately arranged in the ±Y direction, that is, in the column direction. The imaging pixels 13 are arranged according to the Bayer arrangement.

A part of the plurality of the second pixel groups 402 includes first focus detection pixel 11 or second focus detection pixel 12. Each of the first focus detection pixel 11 and the second focus detection pixel 12 have a light-shielding portion 43. In FIG. 3, the second pixel group 402 including the first focus detection pixels 11 is shown as the second pixel groups 402a, 402c, 402e, and the second pixel group 402 including the second focus detection pixels 12 is shown as the second pixel groups 402b, 402d, 402f. The second pixel groups 402a, 402c, 402e including the first focus detection pixels 11 and the second pixel groups 402b, 402d, 402f including the second focus detection pixels 12 will be described below.

In the second pixel group 402a, the B pixel 13 is being replaced with the first focus detection pixel 11a. In the second pixel group 402a, the first focus detection pixels 11a and the G pixels 13 are alternately arranged. The photoelectric conversion unit of the first focus detection pixel 11a receives the light flux that has passed through only one of the first and second pupil regions of the exit pupil of the photographing optical system 31. The light-shielding portion of the first focus detection pixel 11a blocks the light flux that has passed through the other of the first and second pupil regions of the exit pupil of the photographing optical system 31. In the following description, it is assumed that the photoelectric conversion unit of the first focus detection pixel 11a receives the light flux that has passed through the first pupil region of the exit pupil of the photographing optical system 31. The light-shielding portion of the first focus detection pixel 11a shields the light flux that has passed through the second pupil region of the exit pupil of the photographing optical system 31.

In the second pixel group 402b, which is separated from the second pixel group 402a with a predetermined number of rows, the B pixel 13 is being replaced with the second focus detection pixel 12a. In the second pixel group 402b, the second focus detection pixels 12a and the G pixels 13 are alternately arranged. The photoelectric conversion unit of the second focus detection pixel 12a receives the light flux that has passed through a pupil region different from the pupil region of the exit pupil through which the light flux received by the first focus detection pixel 11a passes. The light-shielding portion of the second focus detection pixel 11a blocks the light flux passing through a pupil region different from the pupil region of the exit pupil through which the light flux light-shielded by the first focus detection pixel 11a passes. In the following description, it is assumed that the photoelectric conversion unit of the second focus detection pixel 12a receives the light flux that has passed through the second pupil region of the exit pupil of the photographing optical system 31. The light-shielding portion of the second focus detection pixel 12a shields the light flux that has passed through the first pupil region of the exit pupil of the photographing optical system 31.

The arrangement position of the first focus detection pixel 11a in the second pixel group 402a and the arrangement position of the second focus detection pixel 12a in the second pixel group 402b are the same as each other. That is, the first focus detection pixel 11a and the second focus detection pixel 12a are arranged in the same column.

The first focus detection pixel 11a of the second pixel group 402a and the second focus detection pixel 12a of the second pixel group 402b compose the first AF pixel pair. The second pixel group 402a and the second pixel group 402b may be arranged in a plurality of rows, respectively, and a plurality of the first AF pixel pairs may be arranged.

In the second pixel group 402c, which is separated from the second pixel group 402b with a predetermined number of rows, the B pixel 13 is being replaced with the first focus detection pixel 11b. In the second pixel group 402c, the first focus detection pixels 11b and the G pixels 13 are alternately arranged. The photoelectric conversion unit of the first focus detection pixel 11b, similarly to that of the first focus detection pixel 11a, receives the light flux that has passed through the first pupil region of the exit pupil of the photographing optical system 31. The light-shielding portion of the first focus detection pixel 11b, similarly to that of the first focus detection pixel 11a, blocks the light flux that has passed through the second pupil region of the exit pupil of the photographing optical system 31.

In the second pixel group 402d, which is separated from the second pixel group 402c with a predetermined number of rows, the B pixel 13 is being replaced with the second focus detection pixel 12b. In the second pixel group 402d, the second focus detection pixels 12b and the G pixels 13 are alternately arranged. The photoelectric conversion unit of the second focus detection pixel 12b, similarly to that of the second focus detection pixel 12a, receives the light flux that has passed through the second pupil region of the exit pupil of the photographing optical system 31. The light-shielding portion of the second focus detection pixel 12b, similarly to that of the second focus detection pixel 12a, blocks the light flux that has passed through the first pupil region of the exit pupil of the photographing optical system 31.

The arrangement position of the first focus detection pixel 11b in the second pixel group 402c and the arrangement position of the second focus detection pixel 12b in the second pixel group 402d are the same as each other. That is, the first focus detection pixel 11b and the second focus detection pixel 12b are arranged in the same column.

The first focus detection pixel 11b of the second pixel group 402c and the second focus detection pixel 12b of the second pixel group 402d compose the second AF pixel pair. The second pixel group 402c and the second pixel group 402d may be arranged in a plurality of rows, respectively, and a plurality of the second AF pixel pairs may be arranged.

In the second pixel group 402e, which is separated from the second pixel group 402d with a predetermined number of rows, the B pixel 13 is being replaced with the first focus detection pixel 11c. In the second pixel group 402e, the first focus detection pixels 11c and the G pixels 13 are alternately arranged. The photoelectric conversion unit of the first focus detection pixel 11c, similarly to those of the first focus detection pixels 11a, 11b, receives the light flux that has passed through the first pupil region of the exit pupil of the photographing optical system 31. The light-shielding portion of the first focus detection pixel 11c, similarly to those of the first focus detection pixels 11a, 11b, blocks the light flux that has passed through the second pupil region of the exit pupil of the photographing optical system 31.

In the second pixel group 402f, which is separated from the second pixel group 402e with a predetermined number of rows, the B pixel 13 is being replaced with the second focus detection pixel 12c. In the second pixel group 402f, the second focus detection pixels 12c and the G pixels 13 are alternately arranged. The photoelectric conversion unit of the second focus detection pixel 12c receives the light flux that has passed through the second pupil region of the exit pupil of the photographing optical system 31. The light-shielding portion of the second focus detection pixel 12c, similarly to those of the second focus detection pixels 12a, 12b, blocks the light flux that has passed through the first pupil region of the exit pupil of the photographing optical system 31.

The arrangement position of the first focus detection pixel 11c in the second pixel group 402e and the arrangement position of the second focus detection pixel 12c in the second pixel group 402f are the same as each other. That is, the first focus detection pixel 11c and the second focus detection pixel 12c are arranged in the same column.

The first focus detection pixel 11c of the second pixel group 402e and the second focus detection pixel 12c of the second pixel group 402f compose the third AF pixel pair. The second pixel group 402e and the second pixel group 402f may be arranged in a plurality of rows, respectively, and a plurality of the third AF pixel pairs may be arranged.

Except for in the pixel pairs arranged around the optical axis OA1 (the center of the imaging surface 22a) of the photographing optical system 31, areas of the light-shielding portions of the first, second and third AF pixel pairs are different to each other. Except for the focus detection pixels around the optical axis OA1 of the photographing optical system 31, the incident angles of the light incident on the focus detection pixels are different depending on the exit pupil distances being different. The incident angle increases as the exit pupil distance decreases, and the incident angle decreases as the exit pupil distance increases. The area of the light-shielding portion 43 differs depending on the AF pixel pair in order to block a part of the light incident at different incident angles depending on the exit pupil distance. Thereby, the focus detection unit 215 can accurately detect the defocus amount even if the exit pupil distance differs. It is to be noted, with respect to the pixel pair around the optical axis OA1 (center of the imaging surface 22a) of the photographing optical system 31, an incident angle is 0° in regardless of the exit pupil distance. Therefore, the areas of the light-shielding portions 43 of the first AF pixel pair, the second AF pixel pair, and the third AF pixel pair are the same. As will be described later, the area of the light-shielding portion 43 differs also depending on the position (image height) of the focus detection pixel.

In the present embodiment, each of the first focus detection pixels 11a, 11b, 11c and the second focus detection pixels 12a, 12b, 12c is provided with a filter having spectral characteristics that spectrally disperses the second wavelength region (green (G)) of the incident light. It is to be noted, the filter being provided with each of the focus detection pixels of the first focus detection pixels 11a to 11c and the second focus detection pixels 12a to 12c may have spectral characteristics that spectrally disperses the first wavelength range (red (R) light) or the third wavelength range (blue (B) light). Alternatively, the first focus detection pixels 11a to 11c and the second focus detection pixels 12a to 12c may have filters having spectral characteristics that spectrally disperses the first, second, and third wavelength regions of the incident light.

Figure 4:
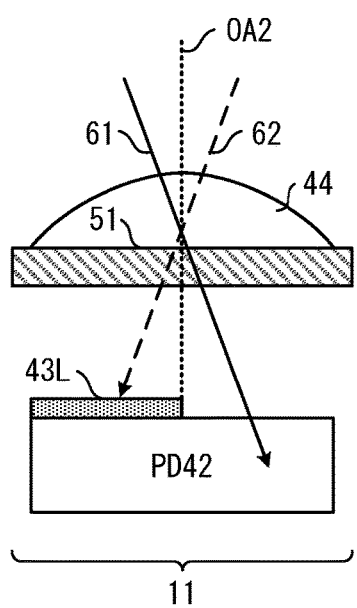
FIG. 4 is a diagram showing a s configuration example of pixels in the imaging device according to the first embodiment.
Figure 4:
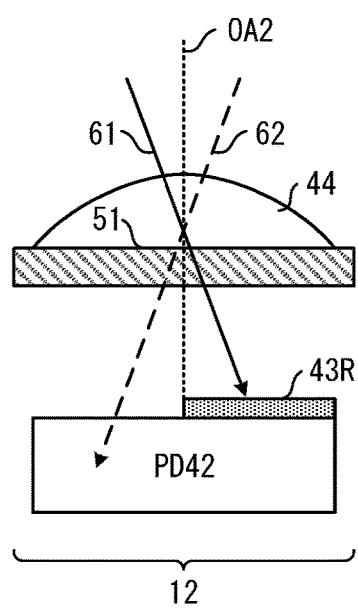
Figure 4:
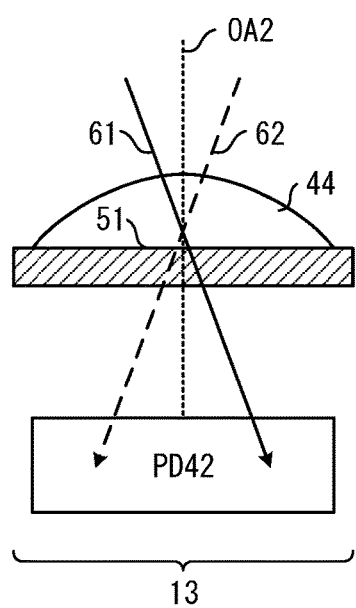
Figure 4:
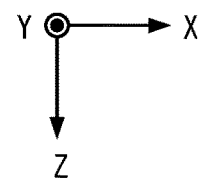

FIG. 4 is a diagram for explaining a configuration example of a focus detection pixel and an imaging pixel provided in the image sensor 22 according to the first embodiment. FIG. 4(a) shows an example of a cross section of the first focus detection pixel 11 among the first and second focus detection pixels 11 and 12 constituting the AF pixel pair. FIG. 4(b) shows an example of a cross section of the second focus detection pixel 12 among the first and second focus detection pixels 11 and 12 constituting the AF pixel pair. FIG. 4(c) shows an example of a cross section of the imaging pixel 13 (R pixel, G pixel, B pixel).

In FIG. 4, each of the first and second focus detection pixels 11 and 12 and the imaging pixel 13 includes a microlens 44, a color filter 51, and a photoelectric conversion unit 42 (PD42) which photoelectrically converts the light transmitted (passed) through the microlens 44 and the color filter 51. The first light flux 61 is a light flux that has passed through the first pupil region of the exit pupil of the photographing optical system 31 among divided in substantially two equal regions. The second light flux 62 is a light flux that has passed through the second pupil region of the exit pupil of the photographing optical system 31 among divided in substantially two equal regions.

In FIG. 4(a), the first focus detection pixel 11 is provided with a light-shielding portion 43L that blocks the second light flux 62 among the first and second light fluxes 61 and 62. The light-shielding portion 43L is provided, between the color filter 51 and the photoelectric conversion unit 42 and so as to position above the photoelectric conversion unit 42. In the example shown in FIG. 4(a), the light-shielding portion 43L is arranged so as to block the left half (−X direction side) of the photoelectric conversion unit 42. The right end (end in the +X direction) of the light-shielding portion 43L substantially coincides with the center line that bisects the photoelectric conversion portion 42 to the left and right. The photoelectric conversion unit 42 of the first focus detection pixel 11 receives the first light flux 61. The photoelectric conversion unit 42 of the first focus detection pixel 11 photoelectrically converts the first light flux 61 to generate an electric charge, and the first focus detection pixel 11 outputs signal Sig1 based on the electric charge generated by the photoelectric conversion unit 42.

The area of the light-shielding portion 43L differs depending on the position (image height) of the first focus detection pixel 11, except for the first focus detection pixel 11 around the optical axis OA1 (center of the imaging surface 22a) of the photographing optical system 31. If the position of the first focus detection pixel 11 differs, that is, the image height differs, the incident angle of the light incident to the first focus detection pixel 11 differs. If the image height increases, the incident angle increases, if the image height decrease, the incident angle decreases, and if the image height is 0, the incident angle is 0°. The area of the light-shielding portion 43L differs depending on the image height in order to block the second light flux 62 of the light incident at the incident angle that differs depending on the image height.

In FIG. 4(b), the second focus detection pixel 12 is provided with a light-shielding portion 43R that blocks the first light flux 61 among the first and second light fluxes 61 and 62. The light-shielding portion 43R is provided, between the color filter 51 and the photoelectric conversion unit 42 and so as to position above the photoelectric conversion unit 42. In the example shown in FIG. 4(b), the light-shielding portion 43R is arranged so as to block the right half (+X direction side) of the photoelectric conversion unit 42. The left end (end in the −X direction) of the light-shielding portion 43R substantially coincides with the center line that bisects the photoelectric conversion portion 42 to the left and right. The photoelectric conversion unit 42 of the second focus detection pixel 12 receives the second light flux 62. The photoelectric conversion unit 42 of the second focus detection pixel 12 photoelectrically converts the second light flux 62 to generate an electric charge, and the second focus detection pixel 12 outputs signal Sig2 based on the electric charge generated by the photoelectric conversion unit 42.

Similarly to that of the first focus detection pixel 11, the area of the light-shielding portion 43R differs depending on the position (image height) of the second focus detection pixel 12, except for the second focus detection pixel 12 around the optical axis OA1 (center of the imaging surface 22a) of the photographing optical system 31. The area of the light-shielding portion 43R differs depending on the image height in order to block the first light flux 61 of the light incident at the incident angle that differs depending on the image height.

FIG. 4(c) shows that the photoelectric conversion unit 42 of the imaging pixel 13 receives the first and second light fluxes 61 and 62 that have passed through the first and second pupil regions of the exit pupil of the photographing optical system 31. The photoelectric conversion unit 42 of the imaging pixel 13 photoelectrically converts the first and second light fluxes 61 and 62 to generate an electric charge, and the imaging pixel 13 outputs signal based on the electric charge generated by the photoelectric conversion unit 42.

Figure 5:
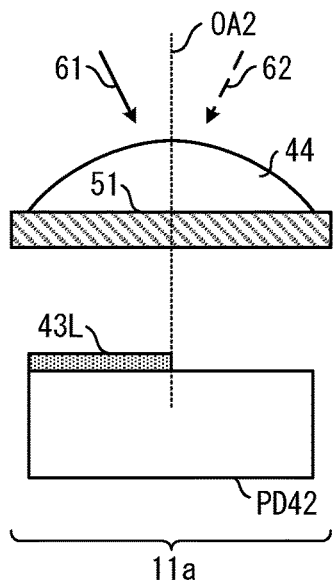
FIG. 5 is a cross-sectional view showing three types of AF pixel pairs to be arranged at the central region of the imaging device according to the first embodiment.
Figure 5:
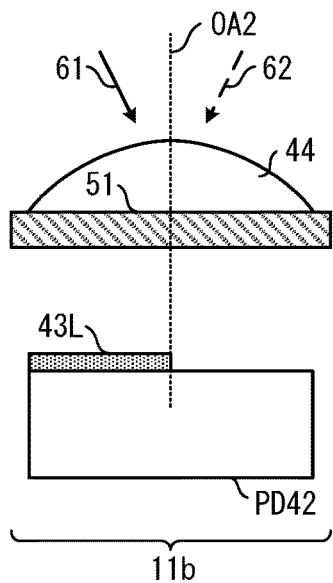
Figure 5:
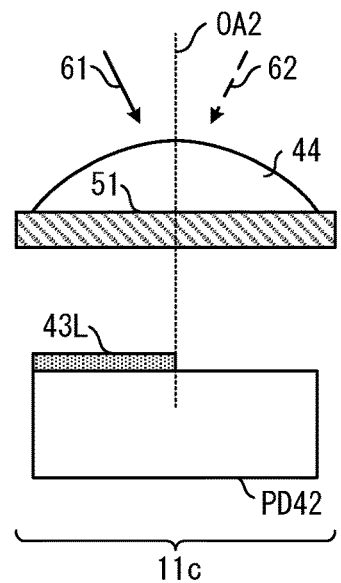
Figure 5:
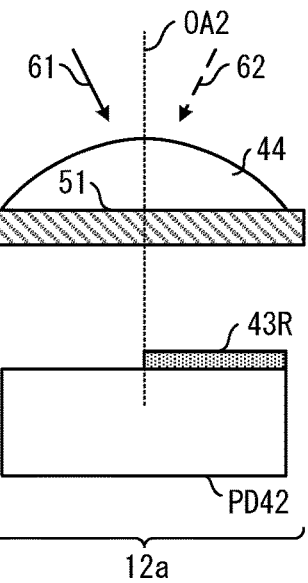
Figure 5:
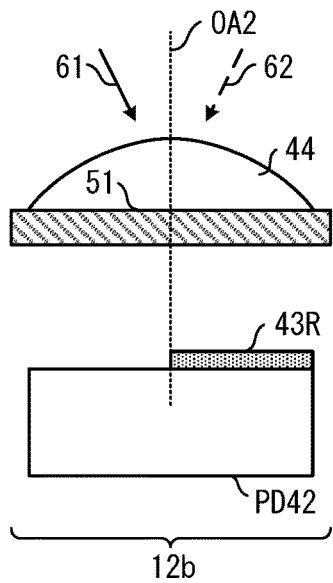
Figure 5:
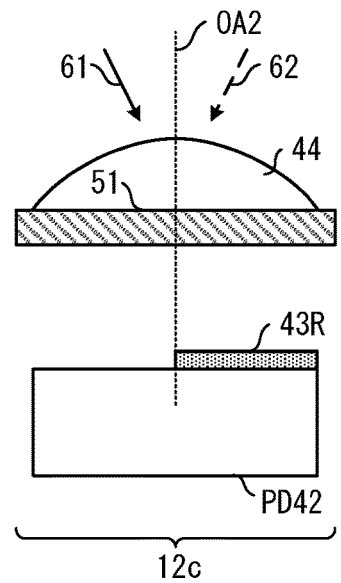

FIG. 5 is a cross-sectional view of three types of AF pixel pairs arranged in a small region 110a (see FIG. 2(b)) within the focus detection area 100a. FIG. 5(a) shows the first and second focus detection pixels 11a and 12a constituting the first AF pixel pair arranged in the second pixel groups 402a and 402b of FIG. 3, respectively. FIG. 5(b) shows the first and second focus detection pixels 11b and 12b constituting the second AF pixel pair arranged in the second pixel groups 402c and 402d of FIG. 3, respectively. FIG. 5(c) shows the first and second focus detection pixels 11c and 12c constituting the third AF pixel pair arranged in the second pixel groups 402e and 402f of FIG. 3, respectively. As shown in FIG. 5, in each of the first focus detection pixels 11a to 11c and the second focus detection pixels 12a to 12c, the center line of the photoelectric conversion unit 42 and the optical axis OA2 of the microlens 44 substantially coincide. Light incident at an incident angle of 0° with respect to the optical axis OA2 of the microlens 44 is focused on the optical axis OA2 of the microlens. Since the line passing through the center of the photoelectric conversion unit 42 coincides with the optical axis OA2 of the microlens 44, the light incident on the microlens 44 is focused on the line passing through the center of the photoelectric conversion unit 42. That is, the light transmitted through the photographing optical system 31 is focused on a line passing through the center of the photoelectric conversion unit 42.

In the first focus detection pixel 11a shown in FIG. 5(a), the right end (end in the +X direction) of the light-shielding portion 43L substantially coincides with the optical axis OA2 of the microlens 44. The light-shielding portion 43L of the first focus detection pixel 11a shields the left half (−X direction side) of the photoelectric conversion unit 42. The second light flux 62 transmitted through the microlens 44 is shielded by the light-shielding portion 43L without being incident on the photoelectric conversion unit 42. Thereby, the photoelectric conversion unit 42 of the first focus detection pixel 11a receives the first light flux 61. In the second focus detection pixel 12a, the left end (end in the −X direction) of the light-shielding portion 43R substantially coincides with the optical axis OA2 of the microlens 44. The first light flux 61 transmitted through the microlens 44 is shielded by the light-shielding portion 43R without being incident on the photoelectric conversion unit 42. Thereby, the photoelectric conversion unit 42 of the second focus detection pixel 12a receives the second light flux 62.

In each of the first focus detection pixels 11b and 11c shown in FIG. 5(b) and FIG. 5(c), the right end (end in the +X direction) of the light-shielding portion 43L substantially coincides with the optical axis OA2 of the microlens 44. Therefore, each photoelectric conversion unit 42 of the first focus detection pixels 11b and 11c, similarly to that of the first focus detection pixel 11a, receives the first light flux 61. Further, in each of the second focus detection pixels 12b and 12c, the left end (end in the −X direction) of the light shielding portion 43R substantially coincides with the optical axis OA2 of the microlens 44. Therefore, similarly to the first focus detection pixel 12a, each photoelectric conversion unit 42 of the second focus detection pixels 12b and 12c receives the second light flux 62.

Figure 6:
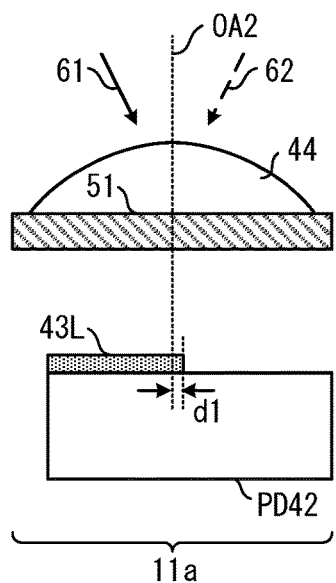
FIG. 6 is a cross-sectional view showing three types of AF pixel pairs to be arranged at a region corresponding to a predetermined image height in the imaging device according to the first embodiment.
Figure 6:
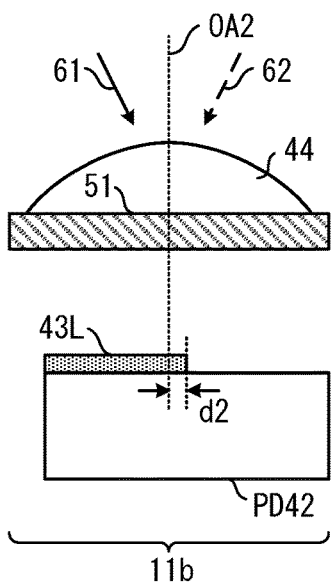
Figure 6:
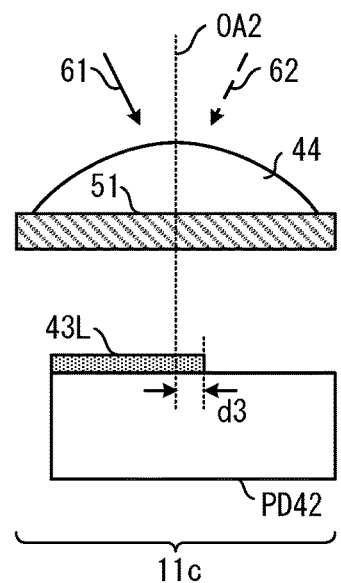
Figure 6:
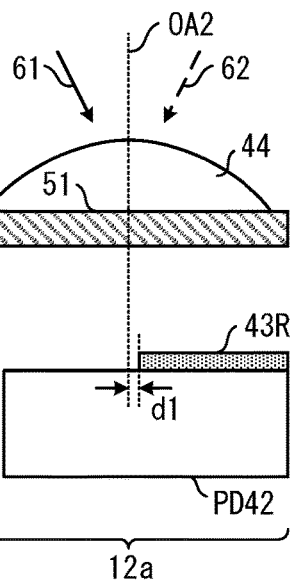
Figure 6:
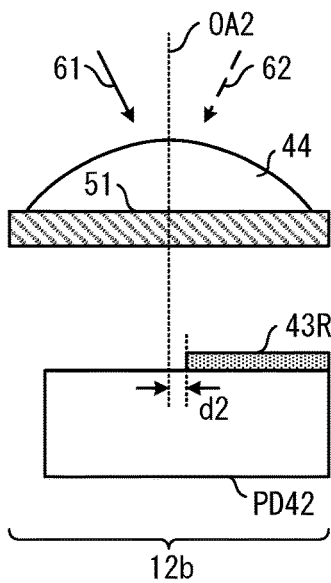
Figure 6:
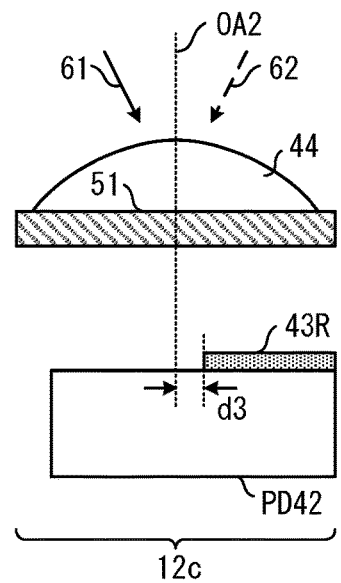

FIG. 6 is a cross-sectional view of three types of AF pixel pairs arranged in a small region 110c (see FIG. 2(b)) separated from the small region 110a in the focus detection area 100a in the +X direction. FIG. 6(a) shows the first and second focus detection pixels 11a and 12a constituting the first AF pixel pair. FIG. 6(b) shows the first and second focus detection pixels 11b and 12b constituting the second AF pixel pair. FIG. 6(c) shows the first and second focus detection pixels 11c and 12c constituting the third AF pixel pair.

As shown in FIG. 6, in each of the first focus detection pixels 11a to 11c and the second focus detection pixels 12a to 12c, a line passing through the center of the photoelectric conversion unit 42 is being shifted in the +X direction with respect to the optical axis OA2 of the microlens 44. In the present embodiment, in the first and second focus detection pixels arranged apart from the small region 110a in the +X direction, the line passing through the center of the photoelectric conversion unit 42 is being shifted in the +X direction with respect to the optical axis OA2 of the microlens 44. Further, in the first and second focus detection pixels arranged apart from the small region 110a in the −X direction, the line passing through the center of the photoelectric conversion unit 42 is being shifted in the −X direction with respect to the optical axis OA2 of the microlens 44.

As shown in FIG. 6, the areas of the light-shielding portions 43L of the first focus detection pixels 11a to 11c are different to each other. The area of the light-shielding portion 43L of the first focus detection pixel 11a is smaller than the area of the light-shielding portion 43L of the first focus detection pixel 11b. The area of the light-shielding portion 43L of the first focus detection pixel 11b is smaller than the area of the light-shielding portion 43L of the first focus detection pixel 11c. The areas of the light-shielding portions 43R of the second focus detection pixels 12a to 12c are different to each other. The area of the light-shielding portion 43R of the second focus detection pixel 12a is larger than the area of the light-shielding portion 43R of the second focus detection pixel 12b. The area of the light-shielding portion 43R of the second focus detection pixel 12b is larger than the area of the light-shielding portion 43R of the second focus detection pixel 12c.

As shown in FIG. 6, the line passing through the center line of the photoelectric conversion unit 42 and the optical axis OA2 of the microlens 44 are deviated, and the area of the light-shielding portions 43 of the first focus detection pixel and the area of the light-shielding portions 43 of the second focus detection pixel are different. Thus, in each of the first and second focus detection pixels, the edge of the light-shielding portion and the optical axis OA2 of the microlens 44 are deviated from each other. In FIG. 6(a), for example, in the first focus detection pixel 11a, the right end (end in the +X direction) of the light-shielding portion 43L is located on the +X direction side by the deviation amount d1 from the optical axis OA2 of the microlens 44. Further, in the second focus detection pixel 12a, the left end (end in the −X direction) of the light-shielding portion 43R is located on the +X direction side by the deviation amount d1 from the optical axis OA2 of the microlens 44.

As shown in FIG. 6, each of the deviation amounts in the second and third AF pixel pairs is different from the deviation amount in the first AF pixel pair. The deviation amount d2 in the first and second focus detection pixels 11b and 12b constituting the second AF pixel pair is larger than the deviation amount d1 in the first and second focus detection pixels 11a and 12a constituting the first AF pixel pair. The deviation amount d3 in the first and second focus detection pixels 11c and 12c constituting the third AF pixel pair is larger than the deviation amount d2 in the first and second focus detection pixels 11b and 12b constituting the second AF pixel pair. That is, d1<d2<d3.

Figure 2:
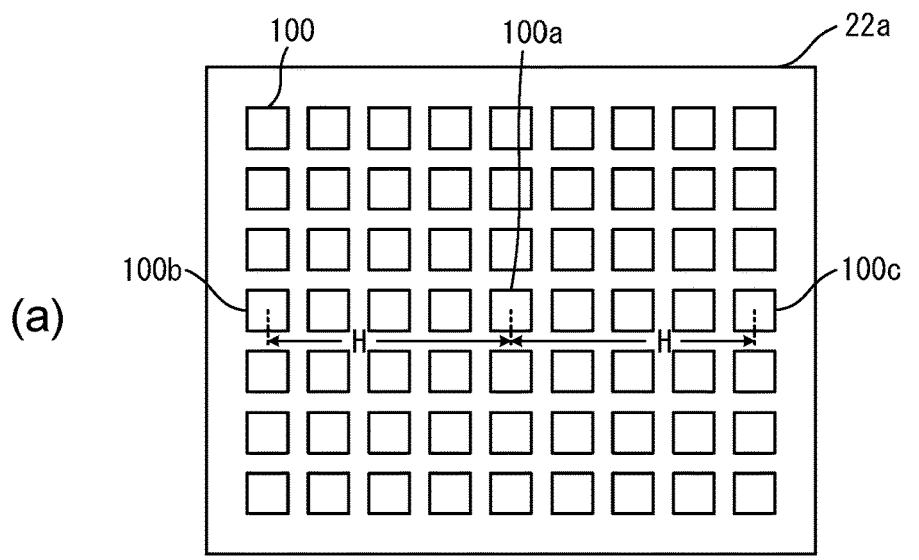
FIG. 2 is a diagram showing a focus detection area of an imaging surface of the imaging device according to the first embodiment.
Figure 2:
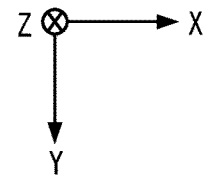
Figure 2:
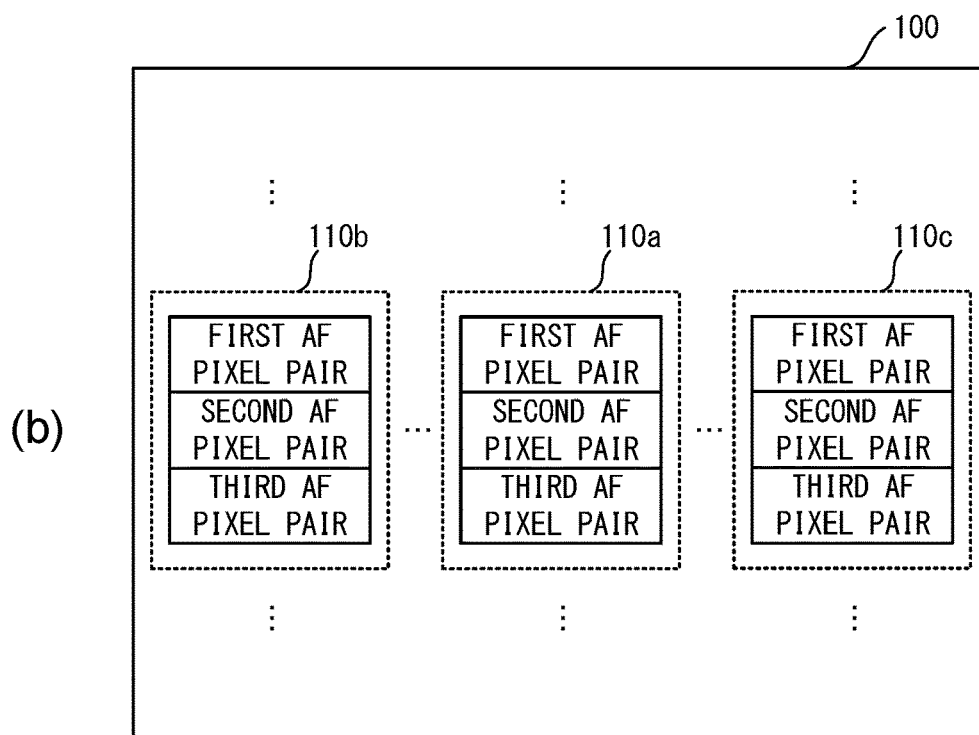
Figure 7:
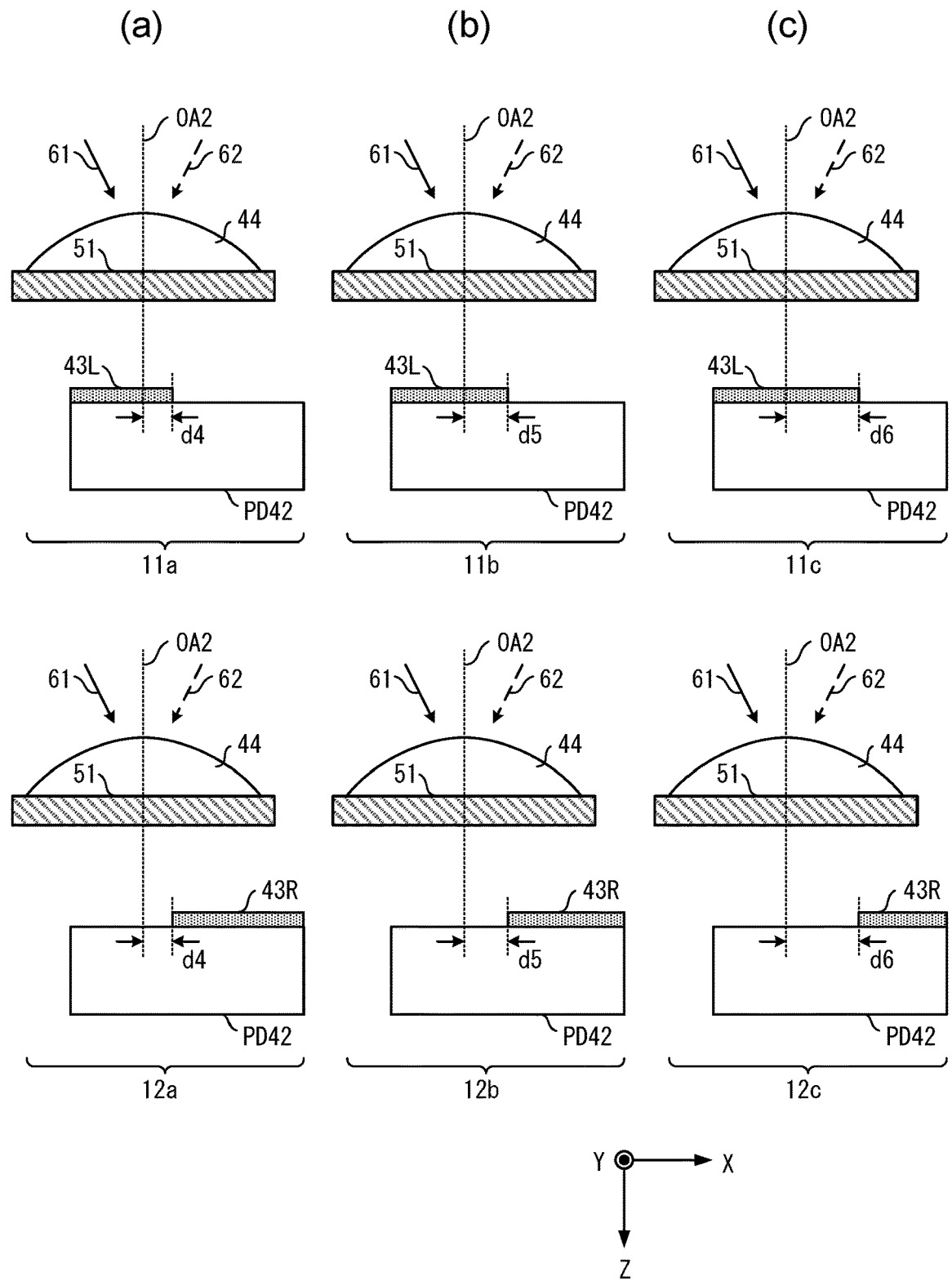
FIG. 7 is a cross-sectional view showing three types of AF pixel pairs to be arranged at a region corresponding to a predetermined image height in the imaging device according to the first embodiment.

FIG. 7 is a cross-sectional view of three types of AF pixel pairs in a part of the focus detection area 100c separated from the focus detection region 100a shown in FIG. 2 in the +X direction. FIG. 7(a) shows the first and second focus detection pixels 11a and 12a constituting the first AF pixel pair. FIG. 7(b) shows the first and second focus detection pixels 11b and 12b constituting the second AF pixel pair. FIG. 7(c) shows the first and second focus detection pixels 11c and 12c constituting the third AF pixel pair.

Similarly to the three types of AF pixel pairs shown in FIG. 6, in each of the first focus detection pixels 11a to 11c and the second focus detection pixels 12a to 12c shown in FIG. 7, a line passing through the center of the photoelectric conversion unit 42 is being shifted in the +X direction with respect to the optical axis OA2 of the microlens 44. Further, similarly to the three types of AF pixel pairs shown in FIG. 6, the areas of the light-shielding portions 43L of the first focus detection pixels 11a to 11c are different to each other. Also, the areas of the light-shielding portions 43R of the second focus detection pixels 12a to 12c are different to each other.

In the three types of AF pixel pairs shown in FIG. 6 and FIG. 7, each of the amounts of deviation of the line passing through the center of the photoelectric conversion unit 42 with respect to the optical axis OA2 of the microlens 44 differs to each other. Further, in the focus detection pixels other than the first focus detection pixel 11b and the second focus detection pixel 12b, the area of the light-shielding portion 43L and the area of the light-shielding portion 43R are different. Compared with the three types of AF pixel pairs shown in FIG. 6, the three types of AF pixel pairs shown in FIG. 7 have a larger deviation amount with respect to the optical axis OA2 of the microlens 44. Further, as compared with the first focus detection pixel 11a and the second focus detection pixel 12a shown in FIG. 6, the first focus detection pixel 11a and the second focus detection pixel 12a shown in FIG. 7 respectively have a smaller area of the light-shielding portion 43L and a larger area of the light-shielding portion 43R. As compared with the first focus detection pixel 11c and the second focus detection pixel 12c shown in FIG. 6, the first focus detection pixel 11c and the second focus detection pixel 12c shown in FIG. 7 respectively have a larger area of the light-shielding portion 43L and a smaller area of the light-shielding portion 43R. The areas of the light-shielding portion 43L and the light-shielding portion 43R in each of the first AF pixel 11b and the second AF pixel 12b shown in FIG. 7 are the same as the areas of those shown in FIG. 6.

In the first focus detection pixel 11a, the right end (end in the +X direction) of the light-shielding portion 43L is deviated by the amount d4 in the +X direction with respect to the optical axis OA2 of the microlens 44. In the second focus detection pixel 12a, the left end (end in the −X direction) of the light-shielding portion 43R is deviated by the amount d4 in the +X direction with respect to the optical axis OA2 of the microlens 44.

Each of the deviation amounts in the second and third AF pixel pairs is different from the deviation amount in the first AF pixel pair. The deviation amount d5 in the first and second focus detection pixels 11b and 12b constituting the second AF pixel pair is larger than the deviation amount d4 in the first and second focus detection pixels 11a and 12a constituting the first AF pixel pair. The deviation amount d6 in the first and second focus detection pixels 11c and 12c constituting the third AF pixel pair is larger than the deviation amount d5 in the first and second focus detection pixels 11b and 12b constituting the second AF pixel pair. That is, d4<d5<d6.

As shown in FIG. 5, FIG. 6 and FIG. 7, the deviation amount between the line passing through the center of the photoelectric conversion unit 42 and the optical axis OA2 of the microlens 44 differs depending on the image height. The higher the image height, the larger the deviation amount, and the lower the image height, the smaller the deviation amount. At a position where the image height is high, light passes through the photographing optical system 31 and is obliquely incident to the microlens 44. That is, the light is incident at an incident angle larger than 0° with respect to the optical axis OA2 of the microlens 44. Therefore, it can also be said that the larger the incident angle of light with respect to the microlens 44, the larger the deviation amount. Incident light having an incident angle larger than 0° with respect to the optical axis OA2 of the microlens 44 is focused as shifting in the +X direction or −X direction from the optical axis OA2 of the microlens. Because the line passing through the center of the photoelectric conversion unit 42 and the optical axis OA2 of the microlens 44 deviate from each other, the light incident on the microlens 44 is focused on the line passing through the center of the photoelectric conversion unit 42. That is, the light transmitted through the photographing optical system 31 is focused on a line passing through the center of the photoelectric conversion unit 42. Thereby, the amount of light transmitted through the photographing optical system 31 and incident on the photoelectric conversion unit 42 can be increased.

As shown in FIG. 5, FIG. 6 and FIG. 7, the area of the light-shielding portion 43 differs depending on the AF pixel pair. As described above, the exit pupil distance of the photographing optical system 31 differs depending on the type of the interchangeable lens 3. Therefore, each of the first AF pixel pair, the second AF pixel pair, and the third AF pixel pair has a light-shielding portion 43 having a different area in order to accurately detect the defocus amount at different exit pupil distances. Further, the area of the light-shielding portion 43L and the area of the light-shielding portion 43R of the first AF pixel pair differ depending on the position (image height) where the first AF pixel pair is arranged. As described above, the exit pupil distance of the photographing optical system 31 differs depending on the image height. Therefore, the first AF pixel pair has a light-shielding portion 43L and a light-shielding portion 43R having an area that differs depending on the image height in order to accurately detect the defocus amount at different exit pupil distances. The same applies to the third AF pixel pair as in the first AF pixel pair. Thereby, the focus detection unit 215 can accurately detect the defocus amount even at different exit pupil distances. That is, the focus detection unit 215 can accurately detect the defocus amount even if the image height or the type of the interchangeable lens changes.

In the first to third AF pixel pairs, the deviation amount between the light-shielding portion 43 and the optical axis of the microlens 44 increases as the image height increases in the +X direction from the small region 110a shown in FIG. 2(b). Comparing the deviation amounts of the first to third AF pixel pairs in the three regions where the image heights are Ha, Hb, and Hc (Ha<Hb<Hc) is as follows. The deviation amount in the first AF pixel pair at the region of image height Hb is larger than the deviation amount in the first AF pixel pair at the region of image height Ha, and is smaller than the deviation amount in the first AF pixel pair at the region of image height Hc. Similarly, the deviation amount in each the second and third AF pixel pairs at the region of image height Hb is respectively larger than the deviation amount in each the second and third AF pixel pairs at the region of image height Ha, and is respectively smaller than the deviation amount in each the second and third AF pixel pairs at the region of image height Hc. The deviation amount d4 in the first AF pixel pair arranged in the focus detection area 100c shown in FIG. 7 is larger than the deviation amount d1 in the first AF pixel pair arranged in the small region 110c shown in FIG. 6. The deviation amounts d5 and d6 in the second and third AF pixel pairs arranged in the focus detection region 100c shown in FIG. 7 are respectively larger than the deviation amounts d2 and d3 in the second and third AF pixel pairs arranged in the small region 110c shown in FIG. 6.

To the first to third AF pixel pairs arranged in the small region 110b separated from the small region 110a shown in FIG. 2(b) in the −X direction, deviation amounts of the same amount as d1 to d3 are respectively given in the direction opposite to the deviation direction shown in FIG. 6. To the first to third AF pixel pairs arranged in the small region 110b shown in FIG. 2(a), deviation amounts of the same amount as d4 to d6 are respectively given in the direction opposite to the deviation direction shown in FIG. 7. The deviation amount in the first to third AF pixel pairs arranged apart from the small region 110a in the −X direction also increases as the image height increases.

As described above, the deviation amounts in the first to third AF pixel pairs are different from each other. Therefore, on the surfaces intersecting in the light incident direction, the areas of light receiving portions of the photoelectric conversion units 42 in each of the first focus detection pixels 11a to 11c are different from each other, and the areas of light receiving portions of the photoelectric conversion units 42 in each of the second focus detection pixels 12a to 12c are different from each other. As described above, in the present embodiment, since the light receiving areas of the photoelectric conversion units 42 are different from each other in the first to third AF pixel pairs, it is possible to perform pupil division corresponding to different incident angles. As a result, the focus detection unit 215 can accurately detect the defocus amount.

Figure 8:
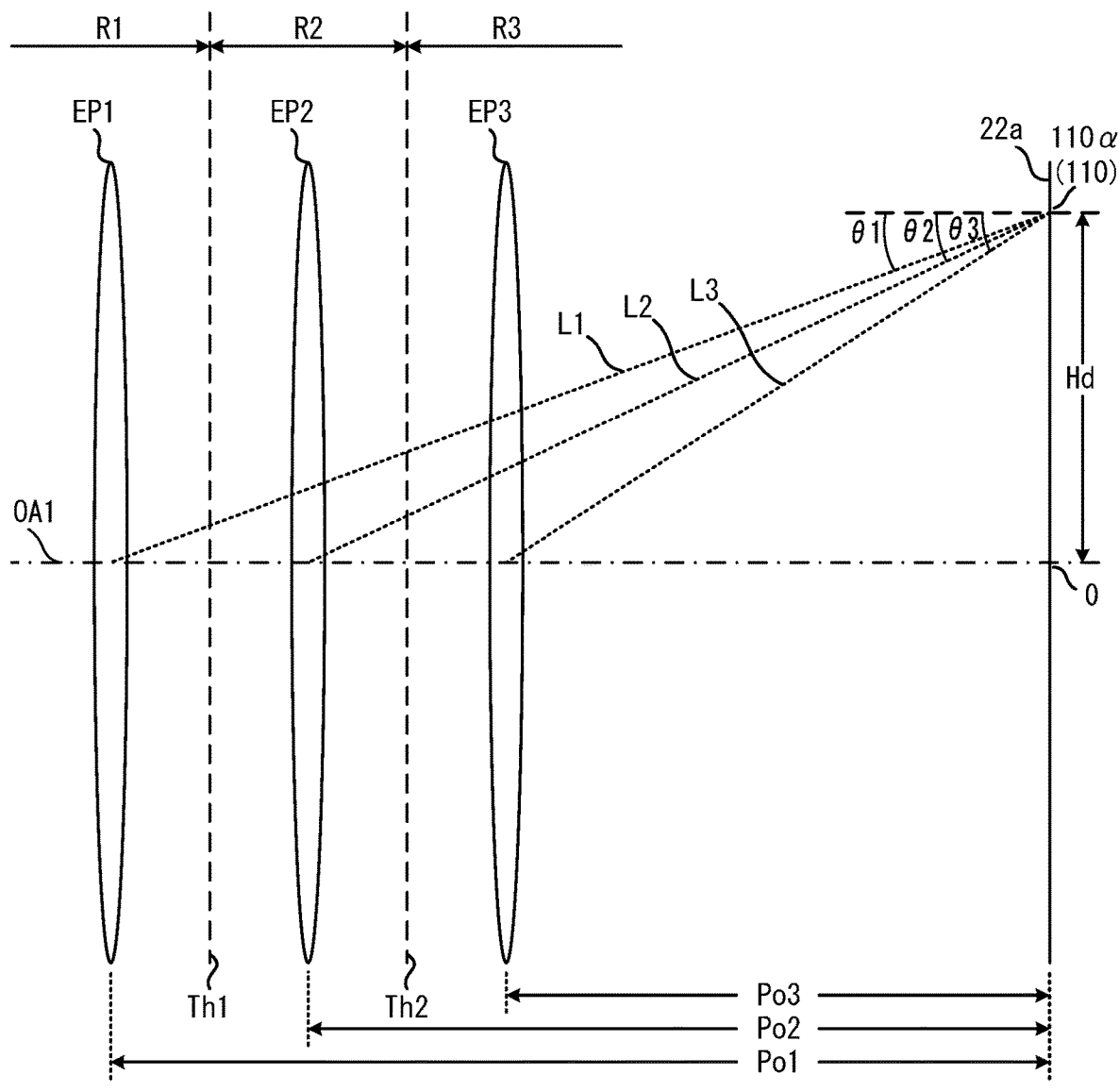
FIG. 8 is a diagram showing the relationship between the reference exit pupil and the image height in the imaging device according to the first embodiment.
Figure 8:
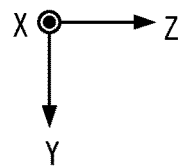

Next, an example of a method for determining the deviation amounts in the first to third AF pixel pairs in the focus detection area 100 will be described. In FIG. 8, 110α represents the position of the small region 110 located at a distance corresponding to the image height Hd from the position 0 (the center position of the imaging surface 22a) where the optical axis OA1 of the photographing optical system 31 intersects the imaging surface 22a of the image sensor 22. A first reference exit pupil EP1, a second reference exit pupil EP2, and a third reference exit pupil EP3 are set on the optical axis OA1 of the photographing optical system 31. The second reference exit pupil EP2 exists closer to the imaging surface 22a than the first reference exit pupil EP1 and exists to the +Z direction side than the first reference exit pupil EP1. The third reference exit pupil EP3 exists closer to the imaging surface 22a than the second reference exit pupil EP2 and exists to the +Z direction side than the second reference exit pupil EP2.

The distance between the first reference exit pupil EP1 and the imaging surface 22a is defined as the first reference exit pupil distance Po1, the distance between the second reference exit pupil EP2 and the imaging surface 22a is defined as the second reference exit pupil distance Po2, and the distance between the third reference exit pupil EP3 and the imaging surface 22a is defined as the third reference exit pupil distance Po3. It is to be noted that Po1>Po2>Po3.

In FIG. 8, L1 indicates the principal ray of the light flux that passes through the first reference exit pupil EP1 and is incident on the focus detection pixel in the small region 110 at the position 110α. L2 indicates the principal ray of the light flux that passes through the second reference exit pupil EP2 and is incident on the focus detection pixel in the small region 110 at the position 110α. L3 indicates the principal ray of the light flux that passes through the third reference exit pupil EP3 and is incident on the focus detection pixel in the small region 110 at the position 110α.

In FIG. 8, assuming that θ1 is the angle of incidence of the principal ray L1 to the focus detection pixel, the deviation amount in the first AF pixel pair in the small region 110 at the image height Hd is determined based on the angle of incidence θ1. Similarly, assuming that θ2 and θ3 respectively are the angles of incidence of the principal rays L2 and L3 to the focus detection pixels, the deviation amounts in the second and third AF pixel pairs in the small region 110 at the image height Hd are determined based on the angles of incidence θ2 and θ3, respectively. As described above, the deviation amount increases as the incident angle increases. Further, except for the position where the image height is 0 (position 0), the longer the exit pupil distance, the smaller the incident angle, so that θ1<θ2<θ3. Therefore, in the first, second, and third AF pixel pairs shown in FIGS. 6(a) to 6(c), the deviation amounts d1, d2, and d3 are as d1<d2<d3. Further, in the first, second, and third AF pixel pairs shown in FIGS. 7(a) to 7(c), the deviation amounts d4, d5, and d6 are as d4<d5<d6.

In such a way, the deviation amount of the first AF pixel pair with respect to the first reference exit pupil EP1 (the first reference exit pupil distance Po1) is determined. Similarly, the deviation amount of the second AF pixel pair with respect to the second reference exit pupil EP2 (the second reference exit pupil distance Po2) and the deviation amount of the third AF pixel pair with respect to the third reference exit pupil EP3 (the third reference exit pupil distance Po3) are determined.

Next, the relationship between the exit pupil distance of the photographing optical system 31 and the first to third AF pixel pairs will be described. As shown in FIG. 8, a first threshold value Th1 regarding the exit pupil distance is set at an intermediate position between the first reference exit pupil EP1 and the second reference exit pupil EP2, and a second threshold value Th2 regarding the exit pupil distance is set at an intermediate position between the second reference exit pupil EP2 and the third reference exit pupil EP3.

The region where the exit pupil distance is equal to or greater than the first threshold Th1 is defined as a first exit pupil distance range R1, the region where the exit pupil distance is between the first threshold Th1 and the second threshold Th2 is defined as a second exit pupil distance range R2, and the region where the exit pupil distance is equal to or less than the second threshold Th2 is defined as a third exit pupil distance range R3.

In a case that the exit pupil distance of the photographing optical system 31 is equal to or greater than the first threshold Th1, that is, in a case that the exit pupil distance of the photographing optical system 31 belongs to the first exit pupil distance range R1, the selection unit 214 selects the first AF pixel pair. In a case that the exit pupil distance of the photographing optical system 31 is between the first threshold Th1 and the second threshold Th2, that is, in a case that the exit pupil distance of the photographing optical system 31 belongs to the second exit pupil distance range R2, the selection unit 214 selects the second AF pixel pair. In a case that the exit pupil distance of the photographing optical system 31 is equal to or less than the second threshold Th2, that is, in a case that the exit pupil distance of the photographing optical system 31 belongs to the third exit pupil distance range R3, the selection unit 214 selects the third AF pixel pair.

As described above, the selection unit 214 selects an appropriate AF pixel pair from the first to third AF pixel pairs depending on, which the exit pupil distance of the photographing optical system belongs to among the first to third exit pupil distance ranges R1 to R3.

Figure 9:
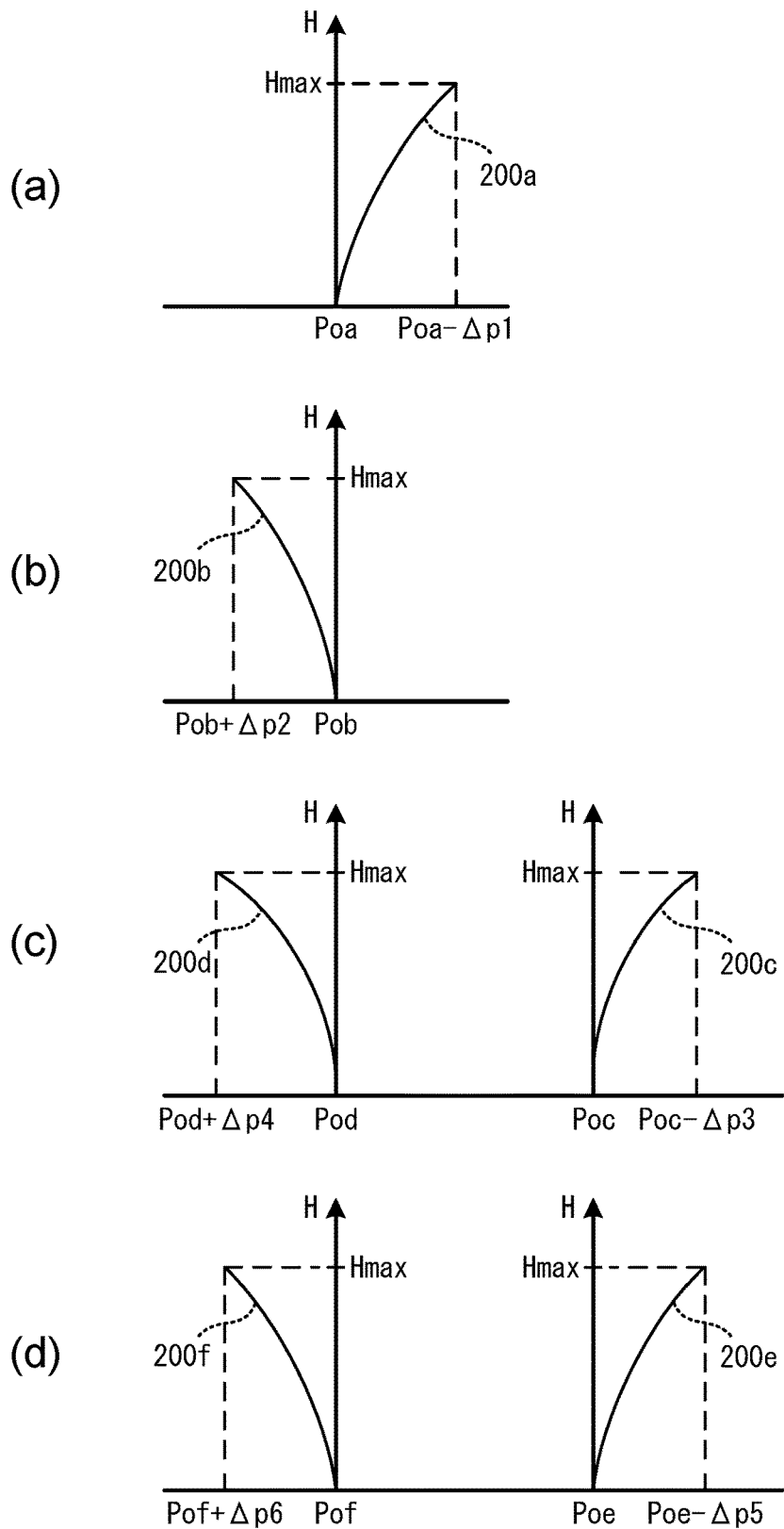
FIG. 9 shows various optical characteristics of an interchangeable lens whose exit pupil distance changes according to the image height, in the imaging device according to the first embodiment.

Next, the optical characteristics of the photographing optical system 31 of the interchangeable lens 3, specifically, the optical characteristics in which the exit pupil distance thereof changes depending on the image height will be described. FIG. 9 shows the optical characteristics of the interchangeable lens 3 to be mounted on the camera body 2 shown in FIG. 1 in which the exit pupil distance changes depending on the image height. In FIG. 9, the horizontal axis represents the exit pupil distance Po, and the vertical axis represents the image height H. FIG. 9(a), FIG. 9(b), FIG. 9(c), and FIG. 9(d) respectively show the optical characteristics of different types of interchangeable lenses. With respect to the optical characteristics of the photographing optical system 31 of the interchangeable lens 3, which is represented by the optical characteristic curve 200a in FIG. 9(a), the exit pupil distance Po decreases as the image height H increases. The optical characteristic curve 200a in FIG. 9(a) shows that, the exit pupil distance is Poa at image height zero, the exit pupil distance gradually decreases as the image height H increases, and the exit pupil distance becomes (Poa−Δp1) at the maximum image height Hmax.

With respect to the optical characteristics of the photographing optical system 31 of the interchangeable lens 3, which is represented by the optical characteristic curve 200b in FIG. 9(b), the exit pupil distance Po increases as the image height H increases. The optical characteristic curve 200b in FIG. 9(b) shows that, the exit pupil distance is Pob at image height zero, the exit pupil distance gradually increases as the image height H increases, and the exit pupil distance becomes (Pob+Δp2) at the maximum image height Hmax.

In the following description, an optical characteristic curve in which the exit pupil distance Po decreases as the image height H increases, such as the optical characteristic curve 200a, is referred to as a negative optical characteristic curve. On the other hand, an optical characteristic curve in which the exit pupil distance Po increases as the image height H increases, such as the optical characteristic curve 200b, is referred to as a positive optical characteristic curve.

The photographing optical system 31 of the interchangeable lens 3 shown in FIG. 9(c) has an optical characteristic curve that differs, that is, changes depending on the position of the focusing lens 31b shown in FIG. 1. This photographing optical system 31 exhibits an optical characteristic curve 200c when the focusing lens 31b is located at a first position and exhibits an optical characteristic curve 200d when the focusing lens 31b is located at a second position. The first and second positions of the focusing lens 31b are arbitrary positions between the infinity position and the closest position, of the focusing lens 31b, including the infinity position and the closest position. The infinity position of the focusing lens 31b is a position where the subject at the infinity distance is in focus, and the closest position is a position where the subject at the closest distance is in focus.

In FIG. 9(c), the optical characteristic curve 200c represents the optical characteristics of the photographing optical system 31 in a case where the focusing lens 31b is at the first position. The optical characteristic curve 200c shows that, the exit pupil distance is Poc at image height zero, the exit pupil distance gradually decreases as the image height H increases, and the exit pupil distance becomes (Poc−Δp3) at the maximum image height Hmax. The optical characteristic curve 200d represents the optical characteristics of the photographing optical system 31 in a case where the focusing lens 31b is at the second position. The optical characteristic curve 200d shows that, the exit pupil distance is Pod at image height zero, the exit pupil distance gradually increases as the image height H increases, and the exit pupil distance becomes (Pod+Δp4) at the maximum image height Hmax.

In FIG. 9(c), the optical characteristic curve 200c in the case where the focusing lens 31b is at the first position is shown as the negative optical characteristic curve, and the optical characteristic curve 200d in the case where the focusing lens 31b is at the second position is shown as the positive optical characteristic curve. However, there can also be an interchangeable lens 3 having an optical characteristic in which both the optical characteristic curve 200c and the optical characteristic curve 200d are both positive or negative.

The photographing optical system 31 of the interchangeable lens 3 shown in FIG. 9(d) has an optical characteristic curve that differs, that is, changes depending on the focal length of the zoom lens (the position of the zoom lens 31a in FIG. 1). This photographing optical system 31 exhibits an optical characteristic curve 200e in a case where both the focal length is f1 and exhibits an optical characteristic curve 200f in a case where the focal length is f2.

In FIG. 9(d), the optical characteristic curve 200e represents the optical characteristics of the photographing optical system 31 in a case where the focal length is f1. The optical characteristic curve 200e shows that, the exit pupil distance is Poe at image height zero, the exit pupil distance gradually decreases as the image height H increases, and the exit pupil distance becomes (Poe−Δp5) at the maximum image height Hmax. The optical characteristic curve 200f represents the optical characteristics of the photographing optical system 31 in a case where the focal length is f2. The optical characteristic curve 200f shows that, the exit pupil distance is Pof at image height zero, the exit pupil distance gradually increases as the image height H increases, and the exit pupil distance becomes (Pof+Δp6) at the maximum image height Hmax.

In FIG. 9(d), the optical characteristic curve 200e in the case where the focal length is f1 is shown as the negative optical characteristic curve, and the optical characteristic curve 200f in the case where the focal length is f2 is shown as the positive optical characteristic curve. However, there can also be an interchangeable lens 3 having an optical characteristic in which both the optical characteristic curve 200e and the optical characteristic curve 200f are both positive or negative.

It is to be noted that the exit pupil distance Po at the image height H in the above description is the distance of the exit pupil of the photographing optical system 31 from view of the image height H of the imaging surface 22a. In other words, the exit pupil distance Po at the image height H is the exit pupil distance (distance from the imaging surface 22a) of the photographing optical system 31 through which the light flux that passes through the photographing optical system 31 and is incident on the position in correspondence with the image height H of the imaging surface 22a.

Figure 10:
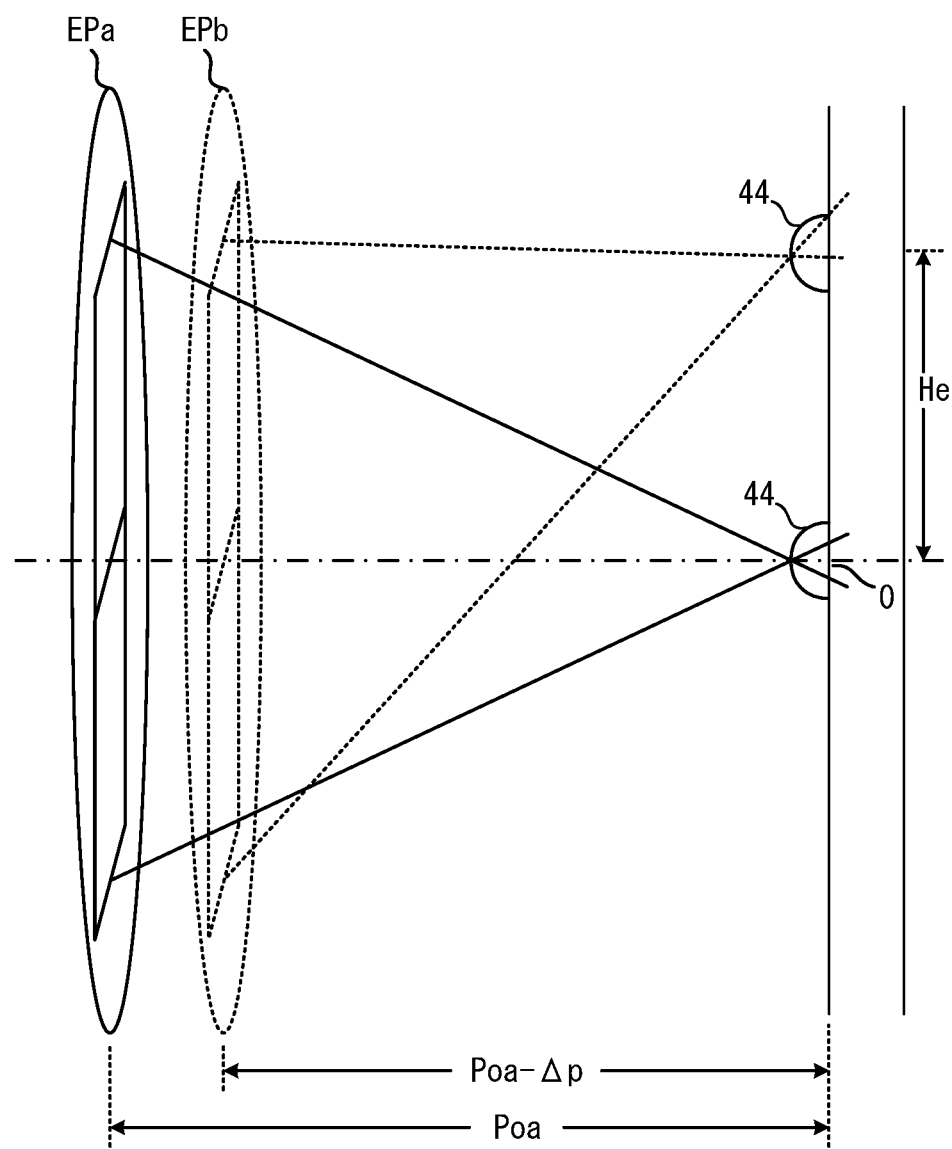
FIG. 10 is a diagram showing the relationship between the image height and the exit pupil in the imaging device according to the first embodiment.

FIG. 10 is a diagram showing the relationship between the image height H and the exit pupil distance Po. In FIG. 10, to the focus detection pixel (in FIG. 10, the microlens 44 is shown on behalf of the focus detection pixel) located at the center position 0 (image height zero) of the imaging surface 22a, the light flux that has passed through the exit pupil EPa (exit pupil distance Poa) of the imaging optical system 31 is incident. The exit pupil distance Poa of this exit pupil EPa is the exit pupil distance of the exit pupil EPa for the image height zero.

Further, a light flux that has passed through the exit pupil EPb of the photographing optical system 31 is incident on the focus detection pixel (in FIG. 10, the microlens 44 is shown on behalf of the focus detection pixel) located at the image height He. The exit pupil distance (Poa−Δp) of the exit pupil EPb is the exit pupil distance of the exit pupil EPb for the image height H.

Here, the relationship between the optical characteristics of each interchangeable lens 3 and the above formula (1) will be described. $Po(H)=h4 \times H^4+h2 \times H^2+Co$ of the above formula (1) is a function to approximate the optical characteristic curves 200a, 200b, 200c, 200d, 200e, 200f and the like shown in FIG. 9(a) to FIG. 9(d). The optical characteristic curve 200a shown in FIG. 9(a) is approximated by the calculation of the formula (1); by setting the constant term Co to the exit pupil distance Poa at the image height zero of FIG. 9(a), and by setting the coefficients h4 and h2 to the coefficients h4a and h2a corresponding to the curve of the optical characteristic curve 200a. As described above, the interchangeable lens 3 having the optical characteristics of FIG. 9(a) stores the constant term Poa and the coefficients h4a and h2a in the lens memory 33 as lens information.

Similarly, with respect to the interchangeable lens 3 having the optical characteristics shown in FIG. 9(b), the constant terms Pob and the coefficients h4b and h2b, that determines a calculation of the formula (1) that approximates the optical characteristics curve 200b are stored in the lens memory 33 as the lens information.

Further, the interchangeable lens 3 shown in FIG. 9(c) has optical characteristics in which the optical characteristic curve changes depending on the position of the focusing lens 31b. The interchangeable lens 3 stores in the lens memory 33 the constant terms Co and the coefficients h4 and h2 for the calculation of the formula (1) that approximate the optical characteristic curve for each position of the focusing lens 31b. The range in which the focusing lens 31b moves (between the infinity position and the closest position) is divided into a plurality of zones Z1 to Zn, and one optical characteristic curve representing the zone (range) is determined for each section Z1 to Zn. For example, the optical characteristic curve in a case where the focusing lens 31b is located at the intermediate position of one zone is defined as the optical characteristic curve representing that zone.

The optical characteristic curve representing the zone Zk is defined as the optical characteristic curve Zk (k=1, 2, . . . n). For the calculation of the formula (1) that approximates the optical characteristic curve Z1 representing the zone Z1, the constant term Co and the coefficients h4 and h2 are set to Poz1, h4z1 and h2z1. For the calculation of the formula (1) that approximates the optical characteristic curve Z2 representing the zone Z2, the constant term Co and the coefficients h4 and h2 are set to Poz2, h4z2 and h2z2. Similarly, for the calculation of the formula (1) that approximates the optical characteristic curve Zn representing the zone Zn, the constant term Co and the coefficients h4 and h2 are set to Pozn, h4zn and h2zn. FIG. 11 shows these zones and the constant terms and coefficients for the calculation for approximating the optical characteristic curves representing these zones. The interchangeable lens 3 stores the zones Z1 to Zn, the constant terms Poz1 to Pozn, and the coefficients h4z1 to h4zn and h2z1 to h2zn shown in FIG. 11 in the lens memory 33, as lens information.

The interchangeable lens 3 shown in FIG. 9(d) is a zoom lens and has optical characteristics in which the optical characteristic curve changes depending on the focal length. The interchangeable lens 3 stores in the lens memory 33 the constant terms Co and the coefficients h4 and h2 for the calculation of the formula (1) that approximate the optical characteristic curve for each focal length. The distance between the maximum focal length and the minimum focal length of the zoom lens set by the zoom lens 31a shown in FIG. 1 is divided into a plurality of zones W1 to Wn, and one optical characteristic curve representing the zone is determined for each zone W1 to Wn. For example, an optical characteristic curve at a focal length in the middle of one zone is defined as an optical characteristic curve representing that zone.

The optical characteristic curve representing the zone Wk is defined as the optical characteristic curve Wk (k=1, 2, . . . n). For the calculation of the formula (1) that approximates the optical characteristic curve W1 representing the zone W1, the constant term Co and the coefficients h4 and h2 are set to Pow1, h4w1 and h2w1. For the calculation of the formula (1) that approximates the optical characteristic curve W2 representing the zone W2, the constant term Co and the coefficients h4 and h2 are set to Pow2, h4w2 and h2w2. Similarly, for the calculation of the formula (1) that approximates the optical characteristic curve Wn representing the zone Wn, the constant term Co and the coefficients h4 and h2 are set to Pown, h4wn and h2wn. FIG. 12 shows these zones and the constant terms and coefficients for the calculation for approximating the optical characteristic curves representing these zones. The interchangeable lens 3 stores the zones W1 to Wn, the constant terms Pow1 to Pown, the coefficients h4w1 to h4wn, and h2w1 to h2wn in the lens memory 33 shown in FIG. 12, as lens information.

Although the interchangeable lens 3 of FIG. 9(d) is a zoom lens having optical characteristics in which the optical characteristic curve changes depending on the focal length, there is another zoom lens having optical characteristics in which the optical characteristic curve changes depending on the position of the focusing lens 31b in addition that the optical characteristic curve changes depending on the focal length. That is, the optical characteristic curve of the another zoom lens changes depending on both the position (focal length) of the zoom lens 31a and the position of the focusing lens 31b.

Figure 13:
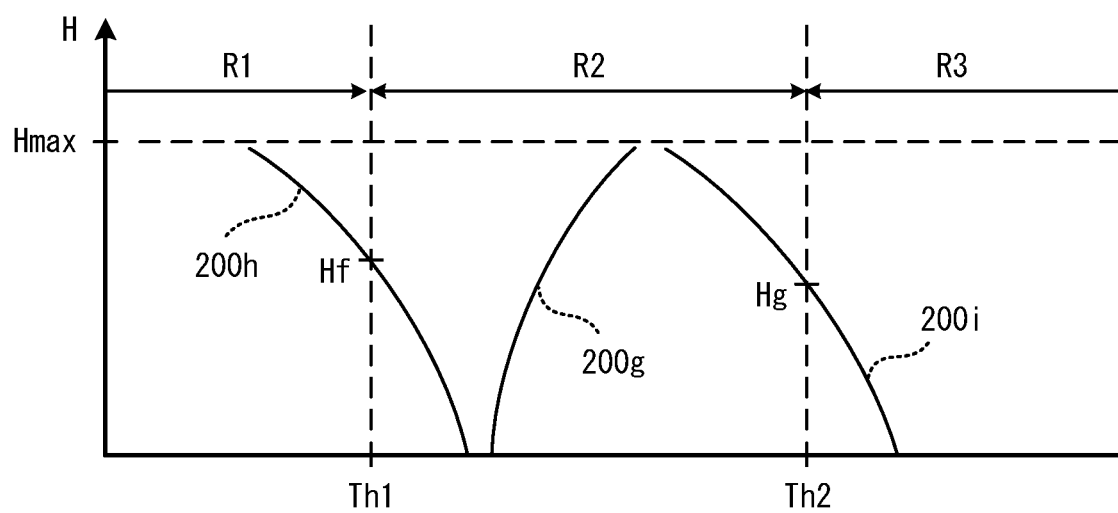
FIG. 13 is a diagram showing, in the imaging device according to the first embodiment, a threshold value of an exit pupil distance, first to third exit pupil distance ranges, and an optical characteristic curve.

Next, the relationship between the optical characteristic curve showing the optical characteristics of the interchangeable lens 3 shown in FIG. 9 and the first to third exit pupil distance ranges R1 to R3 shown in FIG. 8 will be described. FIG. 13 shows; the first and second threshold values Th1 and Th2 regarding the exit pupil distance shown in FIG. 8, the first to third exit pupil distance ranges R1 to R3, and the optical characteristic curve exemplified in FIG. 9. As shown in FIG. 13, in the entire optical characteristic curve 200g, that is, the exit pupil distance from the image height zero to the maximum image height Hmax is located within the second exit pupil distance range R2. In a case where the interchangeable lens 3 having such an optical characteristic curve 200g is attached to the camera body 2, even if the region setting unit 212 set the focus detection area 100 for any image height H, the selection unit 214 selects the second AF pixel pair.

With respect to the optical characteristic curve 200h, the part corresponding to the exit pupil distance from the image height zero to the image height Hf belongs to the second exit pupil distance range R2, and the part corresponding to the exit pupil distance from the image height Hf to the maximum image height Hmax belongs to the first exit pupil distance range R1. In a case where the area setting unit 212 sets the focus detection area 100 at which the image height is Hf or less, the selection unit 214 selects the second AF pixel pair. Further, in a case where the area setting unit 212 sets the focus detection area 100 at which the image height is larger than Hf, the selection unit 214 selects the first AF pixel pair.

With respect to the optical characteristic curve 200i, the part corresponding to the exit pupil distance from the image height zero to the image height Hg belongs to the third exit pupil distance range R3, and the part corresponding to the exit pupil distance from the image height Hg to the maximum image height Hmax belongs to the second exit pupil distance range R2. In a case where the area setting unit 212 sets the focus detection area 100 at which the image height is Hg or less, the selection unit 214 selects the third AF pixel pair. Further, in a case where the area setting unit 212 sets the focus detection area 100 at which the image height is larger than Hg, the selection unit 214 selects the second AF pixel pair.

It is to be noted, as described above, in a case where a plurality of focus detection areas 100 are set by the area setting unit 212, the selection unit 214 selects the same type of AF pixel pairs for all selected focus detection area 100. In such case, the selection unit 214 selects an AF pixel pair based on the position of the focus detection area 100 farthest from the optical axis OA1 of the photographing optical system 31 (the image height H is the highest) among the plurality of selected focus detection areas 100. In the present embodiment, the selection unit 214 selects AF pixel pairs as described above based on the image height of the focus detection area 100 having the highest image height among the plurality of selected focus detection area 100. The selection unit 214 selects AF pixel pairs of the same type as the selected AF pixel pair for the focus detection area 100 of the highest image height among the selected plurality of focus detection areas 100 with respect also to other focus detection areas 100.

Figure 14:
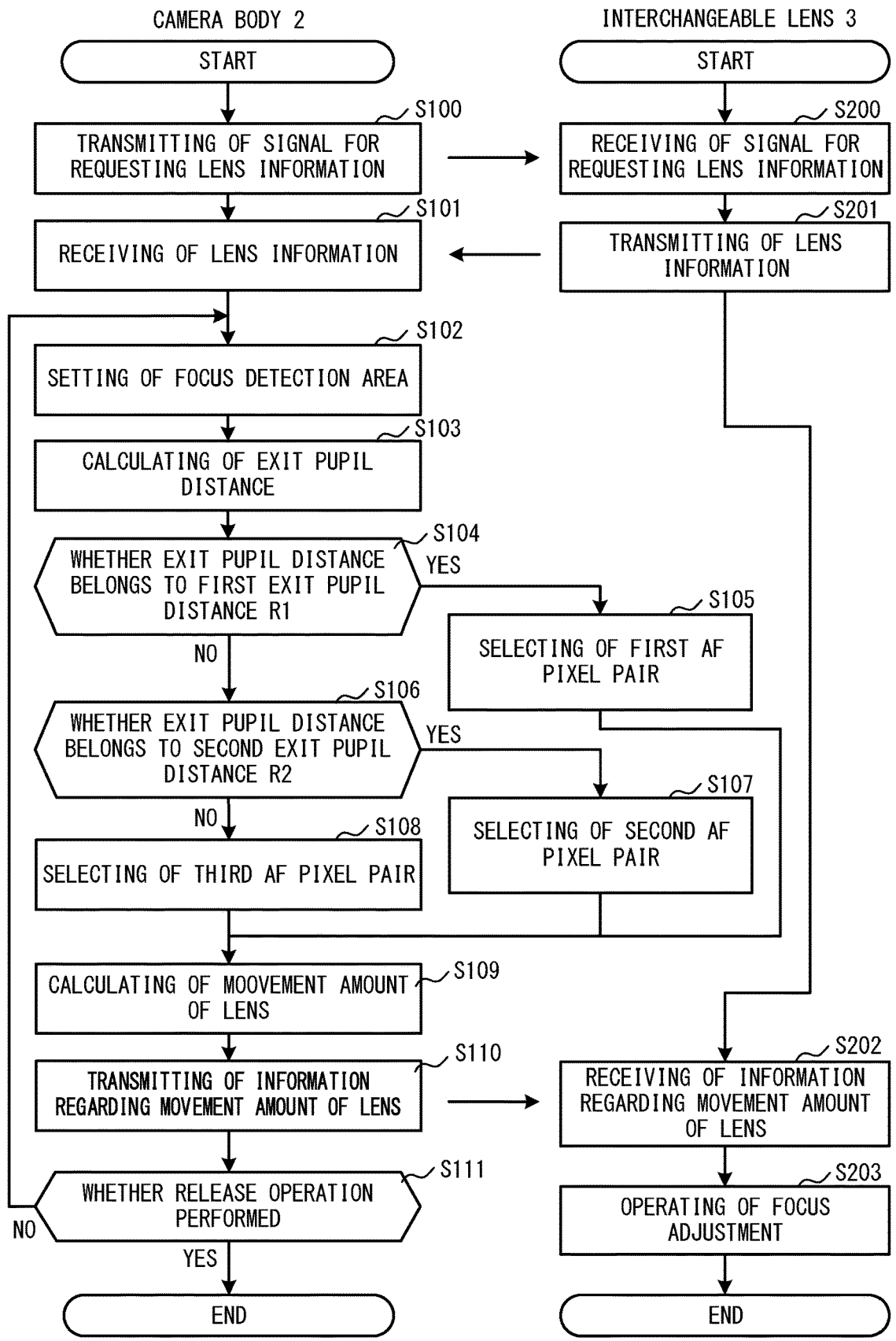
FIG. 14 is a flowchart illustrating an operation in the imaging device according to the first embodiment.
Figure 15:
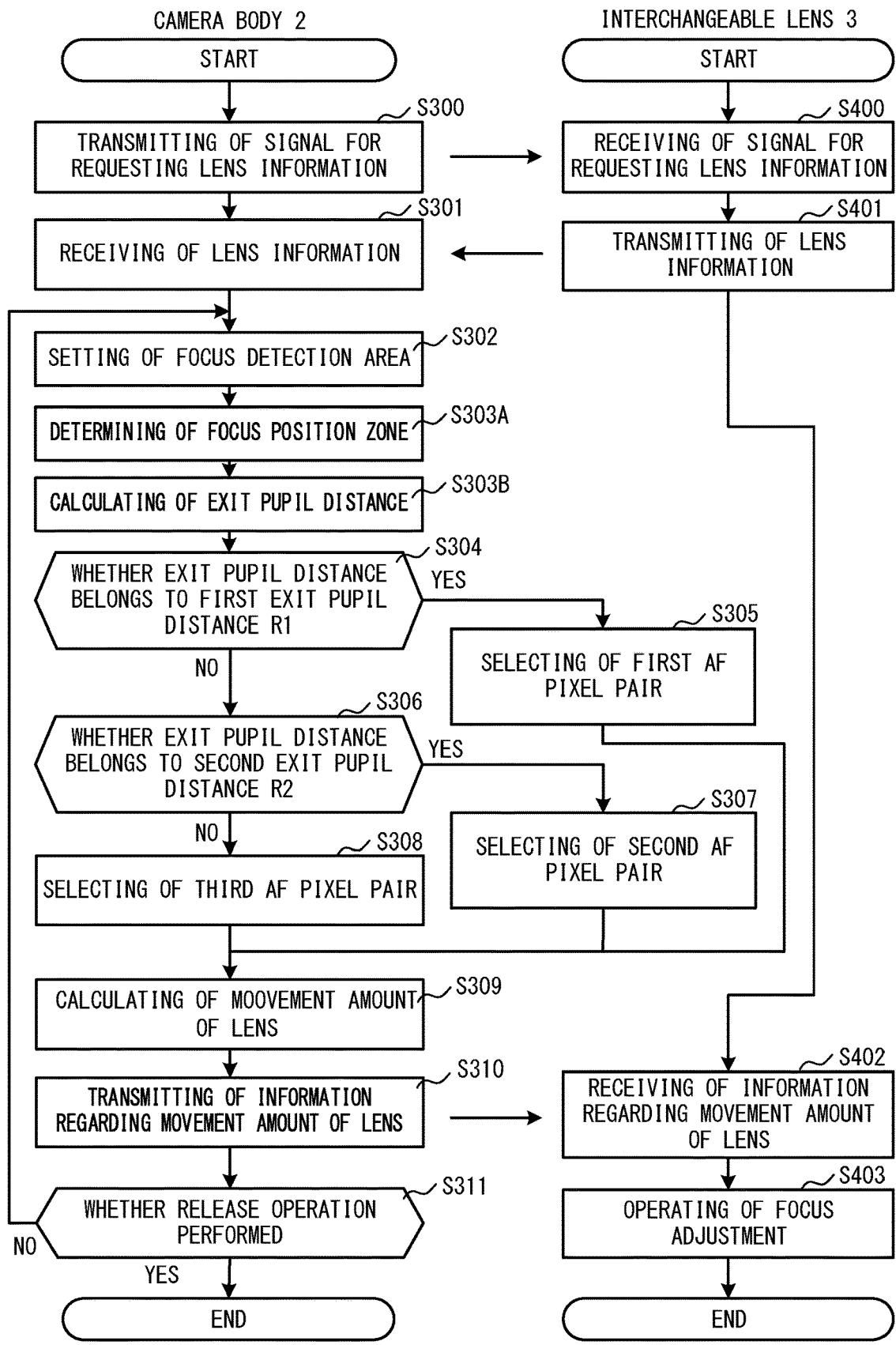
FIG. 15 is a flowchart illustrating an operation in the imaging device according to the first embodiment.
Figure 16:
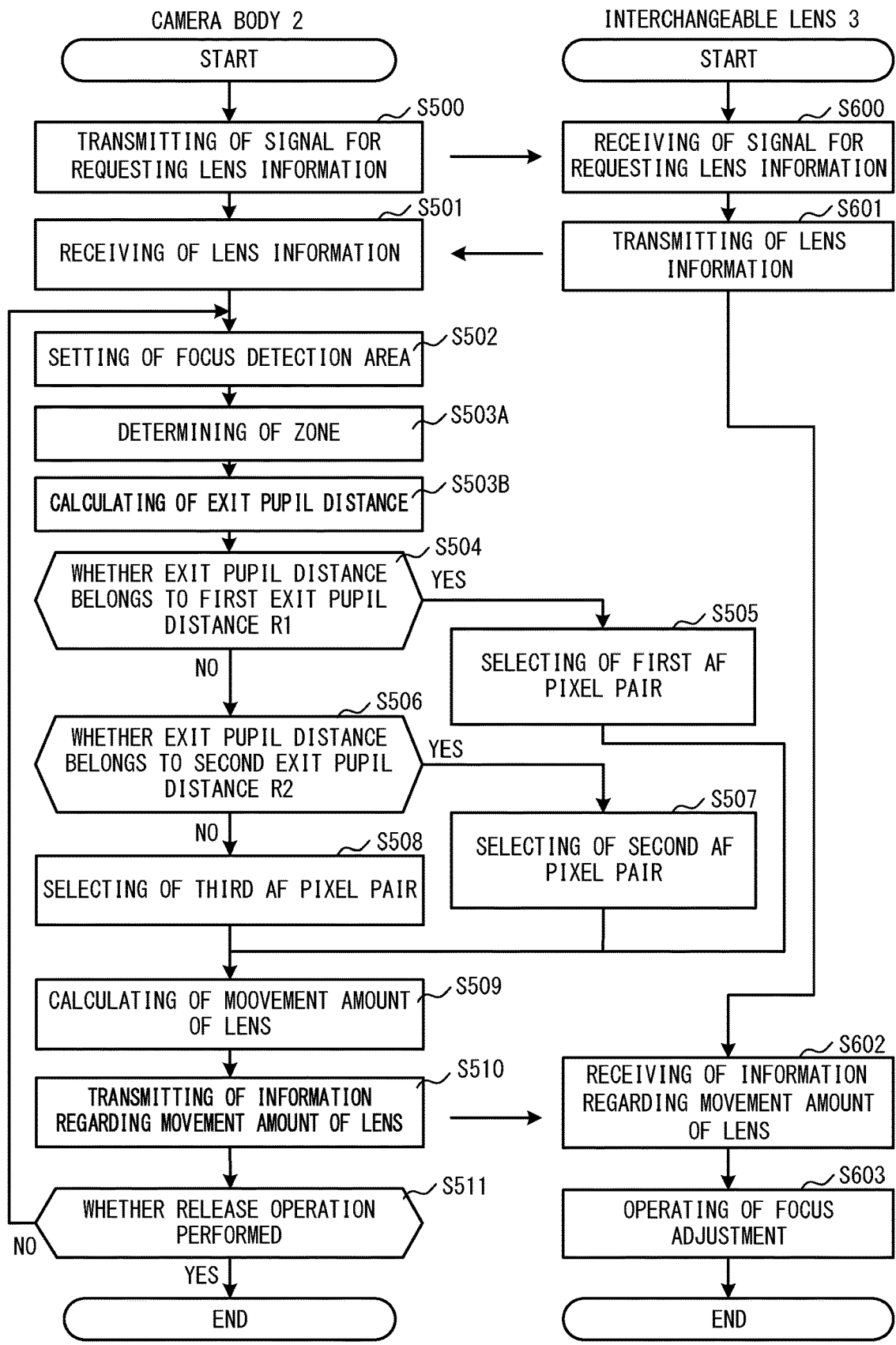
FIG. 16 is a flowchart illustrating an operation in the imaging device according to the first embodiment.

FIG. 14 to FIG. 16 are flowcharts showing an operation example of the camera 1 of the present embodiment. FIG. 14 shows the operation in a case where the interchangeable lens 3 of the type having the photographing optical system 31 having the optical characteristic with a single line as shown in FIG. 9(a) or (b), is attached to the camera body 2. Hereinafter, a case where the interchangeable lens 3 having the optical characteristic curve 200a with a single line as shown in FIG. 9(a) is attached to the camera body 2 will be described.

As shown in FIG. 14, in step S100, upon being turned on the power of the camera body 2, for example, the camera body 2 transmits a signal requesting transmission of lens information to the interchangeable lens 3. In step S200, the interchangeable lens 3 receives the signal requesting the lens information from the camera body 2. In step S201, the interchangeable lens 3 transmits the lens information stored in the lens memory 33 (or the memory in the lens control unit 32) to the camera body 2. The lens information includes the above-mentioned constant term Poa and coefficients h4a and h2a for the calculation of approximating the optical characteristic curve 200a. In step S101, the camera body 2 receives the lens information from the interchangeable lens 3 and stores the lens information in the memory inside the body control unit 210. It is to be noted that the lens information may be stored in the body memory 23.

In step S102, for example, upon operating the operation unit 25 by the user to set the autofocus (AF) mode, the area setting unit 212 of the camera body 2 sets the focus detection area 100 of a predetermined image height Hx as the area at which a focus detection is performed. In step S103, the distance calculation unit 213 of the camera body 2 substitutes the image height Hx of the set focus detection area 100 into the formula (1) which is defined by the constant term Poa and the coefficients h4a and h2a of the lens information and calculate the exit pupil distance Pox for the image height Hx.

In step S104, the distance calculation unit 213 of the camera body 2 determines whether or not the exit pupil distance Pox calculated belongs to the first exit pupil distance range R1. If the determination result is YES, the process proceeds to step S105, and the selection unit 214 selects the first AF pixel pair.

If the determination result in step S104 is NO, the process proceeds to step S106, and the distance calculation unit 213 determines whether or not the calculated exit pupil distance Pox belongs to the second exit pupil distance range R2. If the determination result is YES, the process proceeds to step S107, and the selection unit 214 selects the second AF pixel pair.

If the determination result in step S106 is NO, the exit pupil distance Pox belongs to the third exit pupil distance range R3, so the process proceeds to step S108, and the selection unit 214 selects the third AF pixel pair.

In step S109, the focus detection unit 215 of the camera body 2 performs correlation calculation of the first and second signals Sig1 and Sig2 of the first and second focus detection pixels of the AF pixel pair selected in steps S105, S107 or S108 to calculate the image shift amount. The focus detection unit 215 converts the calculated image shift amount into a defocus amount and calculates the movement amount of the focusing lens 31b based on this defocus amount.

In step S110, the camera body 2 transmits the calculated signal regarding the movement amount of the focusing lens 31b to the interchangeable lens 3. In step S202, the interchangeable lens 3 receives a signal regarding the movement amount of the focusing lens 31b from the camera body 2. In step S203, the interchangeable lens 3 moves the focusing lens 31b based on the movement amount of the focusing lens 31b to perform a focus adjustment operation.

In step S111, the camera body 2 determines whether or not the release operation by the operation unit 25 has been performed. The camera body 2 repeats a series of operations from step S102 to step S110 until the release operation is performed.

FIG. 15 shows the operation in a case where the interchangeable lens 3 whose optical characteristic curve changes depending on the focusing lens position is attached to the camera body 2. Hereinafter, a case where the interchangeable lens 3, shown in FIG. 9(c), whose optical characteristic curve changes depending on the focusing lens positions is attached to the camera body 2 will be described.

As shown in FIG. 15, in step S300, upon being turned on the power of the camera body 2, for example, the camera body 2 transmits a signal requesting transmission of lens information to the interchangeable lens 3. In step S400, the interchangeable lens 3 receives the signal requesting the lens information from the camera body 2. In step S401, the interchangeable lens 3 transmits the lens information stored in the lens memory 33 or the like to the camera body 2. The lens information includes; the zones Z1 to Zn shown in FIG. 11, and with respect to each zone the constant terms Poz1 to Pozn and the coefficients of h4z1 to h4zn and h2z1 to h2zn. Further, the lens information also includes the position information of the focusing lens 31b at the time of transmission. The position information of the focusing lens 31b is repeatedly transmitted to the camera body 2 periodically or every time the position of the focusing lens 31b changes. In step S301, the camera body 2 receives the lens information from the interchangeable lens 3 and stores the lens information in the memory or the like in the body control unit 210.

In step S302, upon the AF mode is being set, the area setting unit 212 of the camera body 2 sets the focus detection area 100 of a predetermined image height Hx as the area at which a focus detection is performed. In step S303A, the distance calculation unit 213 determines which of the zones Z1 to Zn the position of the focusing lens 31b represented by the latest position information transmitted belongs to. In step S303B, by substituting the image height Hx of the set focus detection area 100 into the formula (1) which is defined by the constant term Poz and the coefficients h4z and h2z with respect to determined zone and calculate the exit pupil distance Pox for the image height Hx. In a case where the zone determined is Z1, the image height Hx is substituted into the formula (1) which is defined by the constant term Poz1 and the coefficients h4z1 and h2z1, and the exit pupil distance Pox for the image height Hx is calculated.

In step S304, the distance calculation unit 213 determines whether or not the calculated exit pupil distance Pox belongs to the first exit pupil distance range R1. If the determination result is YES, the process proceeds to step S305, and the selection unit 214 selects the first AF pixel pair.

If the determination result in step S304 is NO, the process proceeds to step S306, and the distance calculation unit 213 determines whether or not the calculated exit pupil distance Pox belongs to the second exit pupil distance range R2. If the determination result is YES, the process proceeds to step S307, and the selection unit 214 selects the second AF pixel pair.

If the determination result in step S306 is NO, the exit pupil distance Pox belongs to the third exit pupil distance range R3, so the process proceeds to step S308, and the selection unit 214 selects the third AF pixel pair.

In step S309, the focus detection unit 215 performs correlation calculation of the first and second signals Sig1 and Sig2 of the first and second focus detection pixels of the AF pixel pair selected in steps S305, S307 or S308 to calculate the image shift amount. The focus detection unit 215 converts the calculated image shift amount into a defocus amount and calculates the movement amount of the focusing lens 31b based on this defocus amount.

In step S310, the camera body 2 transmits the calculated signal regarding the movement amount of the focusing lens 31b to the interchangeable lens 3. In step S402, the interchangeable lens 3 receives a signal regarding the movement amount of the focusing lens 31b from the camera body 2. In step S403, the interchangeable lens 3 moves the focusing lens 31b based on the movement amount of the focusing lens 31b to perform a focus adjustment operation.

In step S311, the camera body 2 determines whether or not the release operation by the operation unit 25 has been performed. The camera body 2 repeats a series of operations from step S302 to step S310 until the release operation is performed.

FIG. 16 shows an operation in a case where the interchangeable lens 3 is a zoom lens and the optical characteristics of the photographing optical system 31 change depending on the focal length as shown in FIG. 9(d).

As shown in FIG. 16, in step S500, upon being turned on the power of the camera body 2, for example, the camera body 2 transmits a signal requesting transmission of lens information to the interchangeable lens 3. In step S600, the interchangeable lens 3 receives the signal requesting the lens information from the camera body 2. In step S601, the interchangeable lens 3 transmits the lens information stored in the lens memory 33 or the like to the camera body 2. The lens information includes; the zones W1 to Wn shown in FIG. 12, and with respect to each zone the constant terms Pow1 to Pown and the coefficients of h4w1 to h4wn and h2w1 to h2wn. Further, the lens information also includes information on the focal length (that is, position information on the zoom lens 31a) of the photographing optical system 31 at the time of transmission. The information on the focal length is repeatedly transmitted to the camera body 2 periodically or every time the position of the focusing lens 31b changes. In step S501, the camera body 2 receives the lens information from the interchangeable lens 3 and stores the lens information in the memory or the like in the body control unit 210.

In step S502, upon the AF mode is being set, the area setting unit 212 of the camera body 2 sets the focus detection area 100 of a predetermined image height Hx as the area at which a focus detection is performed. In step S503A, the distance calculation unit 213 determines which of the zones W1 to Wn the focal length of the focusing lens 31b belongs to based on the latest position information transmitted. In step S503B, by substituting the image height Hx of the set focus detection area 100 into the formula (1) which is defined by the constant term Pow and the coefficients h4w and h2w with respect to determined zone and calculate the exit pupil distance Pox for the image height Hx. In a case where the zone determined is W1, the image height Hx is substituted into the formula (1) which is defined by the constant term Pow1 and the coefficients h4w1 and h2w1, and the exit pupil distance Pox for the image height Hx is calculated.

In step S504, the distance calculation unit 213 determines whether or not the calculated exit pupil distance Pox belongs to the first exit pupil distance range R1. If the determination result is YES, the process proceeds to step S505, and the selection unit 214 selects the first AF pixel pair.

If the determination result in step S504 is NO, the process proceeds to step S506, and the distance calculation unit 213 determines whether or not the calculated exit pupil distance Pox belongs to the second exit pupil distance range R2. If the determination result is YES, the process proceeds to step S507, and the selection unit 214 selects the second AF pixel pair.

If the determination result in step S506 is NO, the exit pupil distance Pox belongs to the third exit pupil distance range R3, so the process proceeds to step S508, and the selection unit 214 selects the third AF pixel pair.

In step S509, the focus detection unit 215 performs correlation calculation of the first and second signals Sig1 and Sig2 of the first and second focus detection pixels of the AF pixel pair selected in steps S505, S507 or S508 to calculate the image shift amount. The focus detection unit 215 converts the calculated image shift amount into a defocus amount and calculates the movement amount of the focusing lens 31b based on this defocus amount.

In step S510, the camera body 2 transmits the calculated signal regarding the movement amount of the focusing lens 31b to the interchangeable lens 3. In step S602, the interchangeable lens 3 receives a signal regarding the movement amount of the focusing lens 31b from the camera body 2. In step S603, the interchangeable lens 3 moves the focusing lens 31b based on the movement amount of the focusing lens 31b to perform a focus adjustment operation.

In step S511, the camera body 2 determines whether or not the release operation by the operation unit 25 has been performed. The camera body 2 repeats a series of operations from step S502 to step S510 until the release operation is performed.

The AF modes described in FIG. 14, FIG. 15 and FIG. 16 include a first AF mode in which the user can select an arbitrary focus detection area 100 and a second AF mode in which the camera 1 automatically selects the focus detection area 100. The first AF mode and the second AF mode each have a mode in which one focus detection area 100 is selected and a mode in which a plurality of focus detection areas 100 are selected. The area setting unit 212 sets the focus detection area(s) 100 selected by the user or the camera 1 as an area at which the focus detention is performed.

According to the above-described embodiment, the following effects can be obtained.
(1) The focus detection device comprises: the imaging unit (the image sensor 22) having the first pixel and the second pixel each of which receives light transmitted through the optical system and outputs signal used for focus detection; the input unit (the body control unit 210) to which the first information regarding the position on the image plane and the exit pupil distance of the optical system is input; the selection unit 214 that selects the first focus detection based on the signal having been output from the first pixel or the second focus detection based on the signal having been output from the second pixel, based on the first information having been input to the input unit; and the focus detection unit 215 that performs the first focus detection or the second focus detection based on the selection by the selection unit. In the present embodiment, information (h4, h2, Co) regarding the exit pupil distance is input from the interchangeable lens 3 to the body control unit 210. The body control unit 210 calculates the exit pupil distance of the photographing optical system 31 for the image height of the focus detection area 100 and selects the AF pixel pair based on the calculated exit pupil distance. Further, the body control unit 210 selects the AF pixel pair to be used for focus detection by the photographing optical system 31 having different optical characteristics. That is, the camera 1 selects the AF pixel pair to be used for focus detection according to the exit pupil distance that changes in one interchangeable lens 3 or the exit pupil distance that changes as replacing the interchangeable lens 3. Thereby, the camera 1 can perform highly accurate focus detection even if the exit pupil distance changes. As a result, it is possible to suppress a decrease in focus detection accuracy.
(2) The imaging device, having the focus detection device, comprises the detachable portion (the body-side mount unit 201, the body-side connection portion 202) that enables to attach and detach the interchangeable lens 3 having the optical system; and wherein: the input unit is for being input the first information from the interchangeable lens 3 attached to the detachable portion. In the present embodiment, information regarding the exit pupil distance is input from the interchangeable lens 3 to the body control unit 210 via the body side connection portion 202. Thereby, the body control unit 210 can select the AF pixel pair used for focus detection based on the information regarding the exit pupil distance and can perform the focus detection with high accuracy even if the exit pupil distance changes.
(3) The interchangeable lens 3 is the interchangeable lens that can be attached to and detached from the camera that has the imaging unit and comprises: the optical system in which the exit pupil distance changes depending on the position on the image plane of the imaging unit; and the output unit (the lens control unit 32) that outputs the first information regarding the position on the image plane and the exit pupil distance to the camera. In the present embodiment, the lens control unit 32 of the interchangeable lens 3 outputs information regarding the exit pupil distance of the photographing optical system 31 to the camera body 2. Thereby, the camera body 2 can select the AF pixel pair used for focus detection based on the information regarding the exit pupil distance, and can perform highly accurate focus detection even if the exit pupil distance changes.

Variation 1

Figure 17:
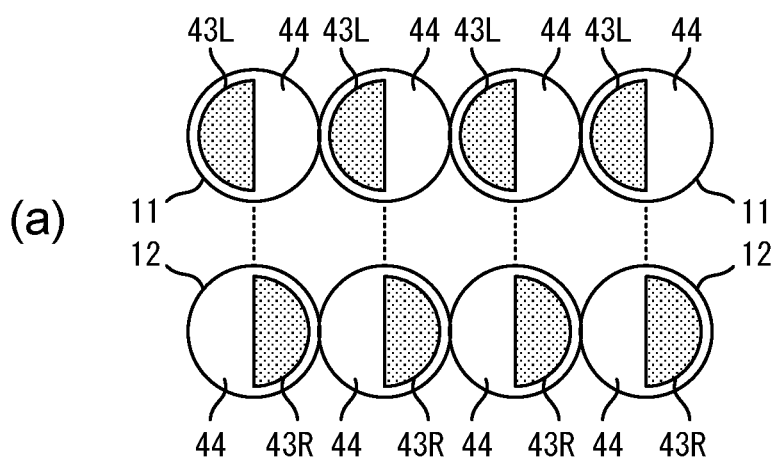
FIG. 17 is a diagram showing the structural example of the focus detection pixels in the imaging device according to the first embodiment.
Figure 17:
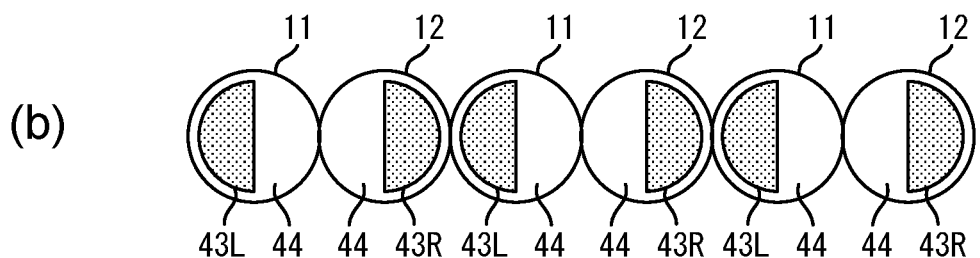
Figure 17:
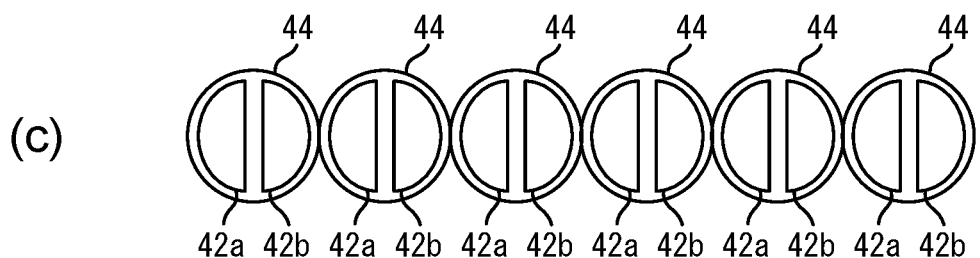

FIG. 17(a) is a diagram which shows by being extracted the first and second focus detection pixels of the AF pixel pair among the pixels of the image sensor 22 shown in FIG. 3. FIG. 17 (b) and FIG. 17 (c) show the focus detection pixels of variations thereof. It is to be noted, in the example shown in FIG. 3, the photoelectric conversion unit 42, the light-shielding portion 43L, and the light-shielding portion 43R are respectively shown in a rectangular shape, however, they may have a circular shape or a shape other than that. In FIG. 17(a) to FIG. 17(c), the photoelectric conversion unit 42, the light-shielding portion 43L, and the light-shielding portion 43R are respectively shown in substantially a circular shape.

In FIG. 17(a), the first focus detection pixel 11 (microlens 44 and light-shielding portion 43L) and the second focus detection pixel 12 (microlens 44 and light-shielding portion 43R) constituting the AF pixel pair are arranged in different rows. On the other hand, the first focus detection pixel 11

(microlens 44 and light-shielding portion 43L) and the second focus detection pixel 12 (microlens 44 and light-shielding portion 43R) constituting the AF pixel pair of the variation shown in FIG. 17(*b*) are arranged alternately in a common row. In FIG. 17(*a*) and FIG. 17(*b*), the first focus detection pixel 11 outputs the first signal Sig1 and the second focus detection pixel 12 outputs the second signal Sig2. It is to be noted, the imaging pixel 13 may be arranged between the first focus detection pixel 11 and the second focus detection pixel 12.

In the first embodiment, an example in which one photoelectric conversion unit is arranged in one pixel has been described, however, a configuration in which two or more photoelectric conversion units are included per pixel may be adopted. In the variation shown in FIG. 17(*c*), each of the plurality of focus detection pixels has a microlens 44 and a first photoelectric conversion unit 42*a* and a second photoelectric conversion unit 42*b* that photoelectrically convert the light transmitted through the microlens 44. That is, this focus detection pixel has the microlens 44 into which the first and second light fluxes passing through the first and second pupil regions of the exit pupil of the photographing optical system 31 are incident, and the first and second photoelectric conversion units 42*a* and 42*b* that receive the first and second light fluxes transmitted through the microlens 44, respectively. The first photoelectric conversion unit 42*a* outputs the first signal Sig1, and the second photoelectric conversion unit 42*b* outputs the second signal Sig2.

It is to be noted, the light receiving area of the first photoelectric conversion unit 42*a* and the light receiving area of the second photoelectric conversion unit 42*b* are different in area to each other. Just as the areas of the light-shielding portion 43L of the first focus detection pixel 11 and the light-shielding portion 43R of the second focus detection pixel 12 as described above differ depending on the image height, area of the light receiving area of the first photoelectric conversion unit 42*a* and area of the light receiving area of the second photoelectric conversion unit 42*b* differs depending on the image height. Further, just as the area of the light-shielding portion 43 differs depending on the type of AF pixel pair described above (first, second, and third AF pixel pairs), area of the light receiving area of the first photoelectric conversion unit 42*a* and area of the light receiving area of the second light receiving area 42*b* differ depending on the AF pixel pair.

Variation 2

In the first embodiment, three reference exit pupils (first to third exit pupils EP1 to EP3) are used as the reference exit pupils, however, two reference exit pupils may be used, and further, 4 or more reference exit pupils may be used.

Variation 3

With respect to the flowchart shown in FIG. 15, in step S401, the zones Z1 to Zn shown in FIG. 11, and with respect to each zone the constant terms Poz1 to Pozn and the coefficients of h4z1 to h4zn and h2z1 to h2zn are all transmitted to the camera body 2. However instead, the interchangeable lens 3 may transmit the constant terms Poz and the coefficients h4z and h2z related to the section determined in step 303A of FIG. 15 to the camera body 2.

With respect to the flowchart shown in FIG. 16, in step S601, the zones W1 to Wn shown in FIG. 12, and with respect to each zone the constant terms Pow1 to Pown and the coefficients of h4w1 to h4wn and h2w1 to h2wn are all transmitted to the camera body 2. However instead, the interchangeable lens 3 may transmit the constant terms Pow and the coefficients h4w and h2w related to the zone determined in step 503A of FIG. 16 to the camera body 2, same as described above.

Variation 4

The method for obtaining the exit pupil distance at a predetermined image height is not limited to the method for obtaining using the above-mentioned formula (1). For example, instead of the formula (1), a calculation formula using the cube of the image height can be used. Further, information (table) showing the relationship between the image height and the exit pupil distance may also be used without using the calculation formula.

Variation 5

In the first embodiment, an example in which information regarding the exit pupil distance is stored in advance in the lens memory 33 or the like and the information regarding the exit pupil distance is input from the interchangeable lens 3 to the camera body 2 has been described. However, the information regarding the exit pupil distance may be input to the camera body 2 from other than the interchangeable lens 3. For example, the body memory 23 may store the information regarding the exit pupil distance in advance, and the body control unit 210 may acquire the information regarding the exit pupil distance from the body memory 23. Further, the camera body 2 may acquire the information regarding the exit pupil distance from a storage medium or may acquire the information regarding the exit pupil distance from an external device by wired communication or wireless communication. It is to be noted, the information regarding the exit pupil distance may be information regarding the exit pupil distance corresponding to one image height.

Variation 6

In the first embodiment, the parameters (h4) and (h2) and the constant term Co, used for calculating the exit pupil distance Po (H) have been described as examples of the information regarding the exit pupil distance. However, the camera body 2 may acquire the value Po (H) itself of the exit pupil distance for a predetermined image height from the interchangeable lens 3, the storage medium, or the like as the information regarding the exit pupil distance.

Variation 7

In the first embodiment, the selection unit 214 selects an AF pixel pair to be used for focus detection among a plurality of types of AF pixel pairs arranged in the focus detection area 100 set by the area setting unit 212 was exemplified for explanation. However, the selection unit 214 may select the first and second signals Sig1 and Sig2 used for focus detection. In this case, the image sensor 22 outputs the first and second signals Sig1 and Sig2 of the first, second and third AF pixel pairs to the body control unit 210, respectively. The selection unit 214 may select the first and second signals Sig1 and Sig2 output from the AF pixel pair used for the focus detection among the first and second signals Sig1 and Sig2 output from each of the first, second and third AF pixel pairs.

The selection unit 214 may switch between selecting the AF pixel pair and selecting the first and second signals Sig1 and Sig2 according to the photographing mode (operation mode) of the camera body 2 (or camera 1). For example, in a case where a through image (live view image) of a subject is displayed on the display unit 24 or photographing a low-resolution moving image is performed, the selection unit 214 may select AF pixel pairs to be used for focus detection. Further, in a case where a high-speed continuous photographing or high-resolution moving image photographing is performed, the selection unit 214 may select the first and second signals Sig1 and Sig2 output from the AF pixel pair used for focus detection.

Second Embodiment

Next, a camera according to the second embodiment will be described. In the camera according to the second embodiment, the focus detection unit 215 converts an image shift amount into a defocus amount, that is, the focus detection unit 215 changes a conversion formula for conversion according to the image height. In the following description, the description of the same part as the configuration and operation of the camera according to the first embodiment will be omitted, and the configuration and operation different from the configuration and operation of the camera according to the first embodiment will be mainly described.

Figure 18:
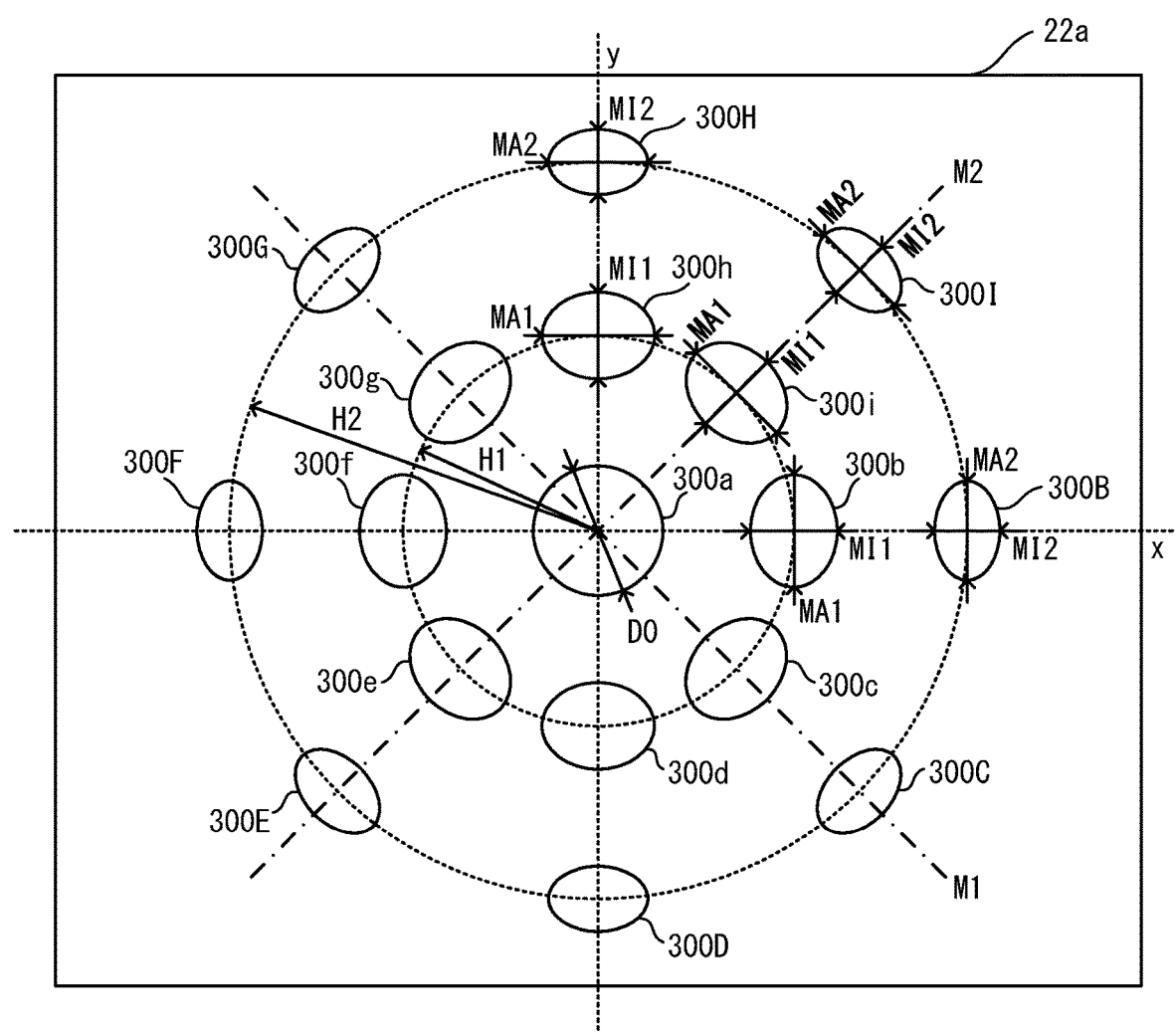
FIG. 18 is a diagram showing how an exit pupil image changes depending on image height, in an imaging device according to the second embodiment.

FIG. 18 shows how exit pupil images 300a to 300i and 300B to 300I on an imaging surface 22a of the image sensor 22 change depending on the image height. The exit pupil image is an image of which the exit pupil of the photographing optical system 31 is projected onto the photoelectric conversion unit through the microlens of the focus detection pixel. The shape of the exit pupil of the photographing optical system 31 changes depending on the shape of the opening of the aperture 31c.

FIG. 18 illustrates an exit pupil image 300a for the image height of zero (center position of the imaging surface 22a), exit pupil images 300b to 300i for the first image height H1, and exit pupil images 300B to 300I for the second image height H2 larger than the first image height H1. The exit pupil images 300b to 300i for the first image height H1 are distributed on a circumference of a circle of a radius of H1 (the first image height), among concentric circles. The exit pupil images 300B to 300I for the second image height H2 are distributed on a circumference of a circle of a radius of H2 (the second image height), among concentric circles.

Assuming that the xy-coordinates with the center of the imaging surface 22a as the origin, the exit pupil image 300b and the exit pupil image 300B position on the x-axis, and the exit pupil image 300f and the exit pupil image 300F also position on the x-axis. The exit pupil image 300b and the exit pupil image 300f are point-symmetrical with respect to the origin, and the exit pupil image 300B and the exit pupil image 300F are point-symmetrical with respect to the origin. The exit pupil image 300d and the exit pupil image 300D position on the y-axis, and the exit pupil image 300h and the exit pupil image 300H also position on the y-axis. The exit pupil image 300d and the exit pupil image 300h are point-symmetrical with respect to the origin, and the exit pupil image 300D and the exit pupil image 300H are point-symmetrical with respect to the origin.

The exit pupil image 300c, the exit pupil image 300C, the exit pupil image 300g, and the exit pupil image 300G are positioned on the radial direction line M1 tilted 45° with respect to the x-axis. The exit pupil image 300c and the exit pupil image 300g are point-symmetrical with respect to the origin, and the exit pupil image 300C and the exit pupil image 300G are point-symmetrical with respect to the origin. The exit pupil image 300e, the exit pupil image 300E, the exit pupil image 300i, and the exit pupil image 300I are positioned on the radial direction line M2 tilted 45° with respect to the y-axis. The exit pupil image 300e and the exit pupil image 300i are point-symmetrical with respect to the origin, and the exit pupil image 300E and the exit pupil image 300I are point-symmetrical with respect to the origin.

The shape of exit pupil image 300a for the image height of zero is that of the opening of the aperture 31c, that is, a substantially circle, which is the shape of the exit pupil. The exit pupil images 300b to 300i for the first image height H1 positioned on the common circumference have substantially elliptical shapes that are the same to each other, and the exit pupil images 300B to 300I for the second image height H2 positioned on the common circumference have substantially elliptical shapes that are the same to each other. Regarding the substantially elliptical shape of the exit pupil images 300b to 300i for the first image height H1, the major axis MA1 which is the length of the major axis and the minor axis MI1 which is the length of the minor axis are both smaller than the diameter D0 of the substantially circle of the pupil image 300a which is for the image height of zero. Regarding the substantially elliptical shape of the exit pupil images 300B to 300I of the second image height H2, the major axis MA2 thereof is smaller than the major axis MA1 of the exit pupil images 300b to 300i of the first image height H1, and the minor axis MI2 thereof is smaller than the minor axis MI1 of the exit pupil images 300b to 300i of the first image height H1.

It is to be noted that the direction of the major axis MA of each elliptical exit pupil image is perpendicular to the radial direction. That is, each of the major axis of the exit pupil images 300b, 300B, 300f, 300F on the x-axis is perpendicular to the x-axis, and each of the major axis of the exit pupil images 300d, 300D, 300h, 300H on the y-axis is perpendicular to the y-axis. Further, each of the major axis of the exit pupil images 300c, 300C, 300g, 300G which are on the radial direction line M1 is perpendicular to the radial direction line M1, and each of the major axis of the exit pupil images 300e, 300E, 300i, 300I which are on the radial direction line M2 is perpendicular to the radial direction line M2.

As described above, the exit pupil image is substantially circular for the image height of zero, however, the exit pupil image becomes substantially elliptical as the image height H increases. The substantially elliptical shape of the exit pupil image is that the major axis MA and the minor axis MI gradually decrease as the image height H increases. The shape and size of the exit pupil image change depending on the image height H. Further, since the shape and size of the exit pupil image change depending on the optical characteristics of the photographing optical system 31, they also differ depending on the type of the interchangeable lens 3.

Figure 19:
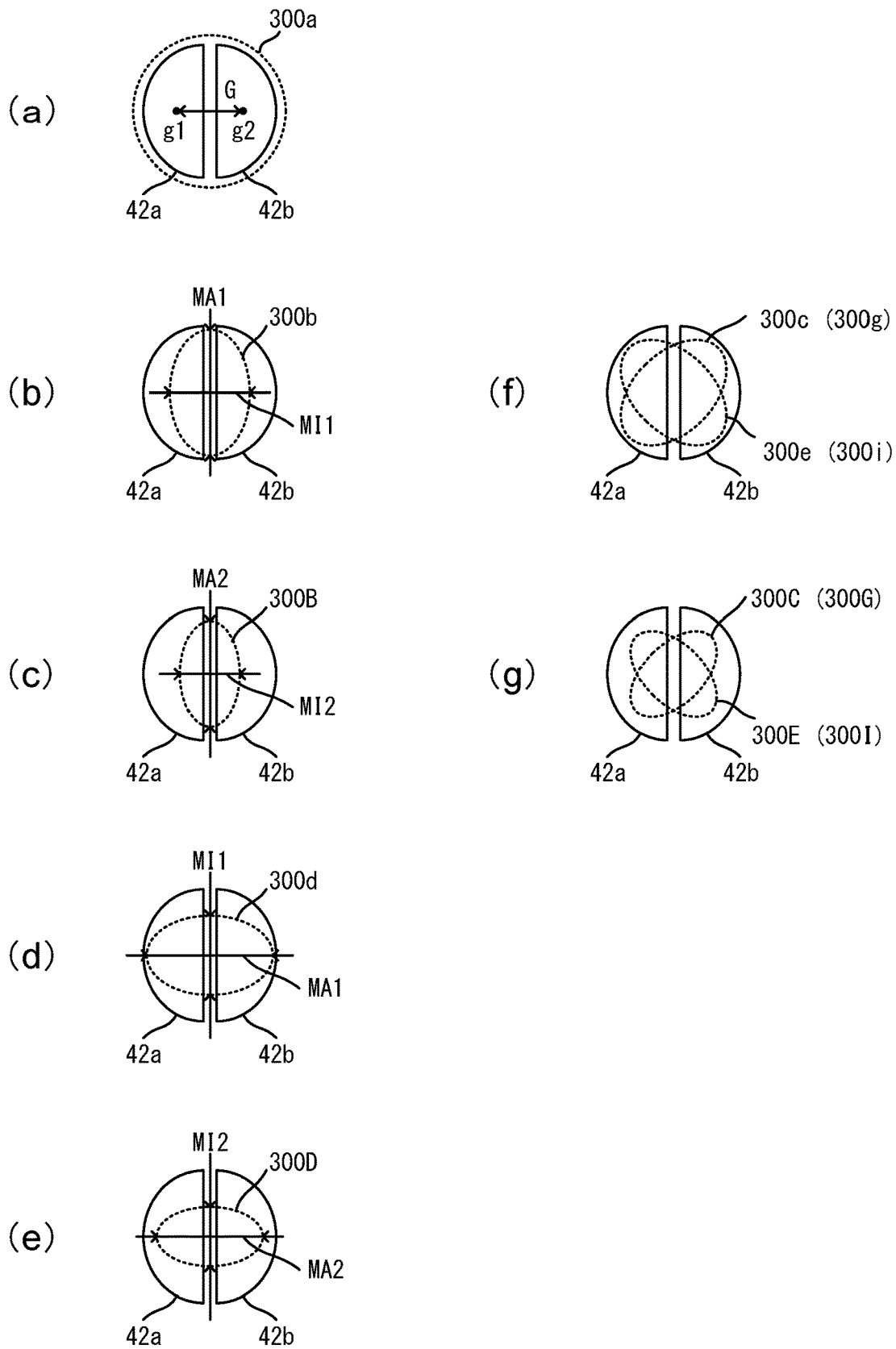
FIG. 19 is a diagram showing a relationship between a pair of photoelectric conversion units and an exit pupil image, in the imaging device according to the second embodiment.

Next, the relationship between the photoelectric conversion unit of the focus detection pixel and the exit pupil image projected on the photoelectric conversion unit through the microlens will be described. FIG. 19 is a diagram showing the relationship between the pair of photoelectric conversion units 42a and 42b and the exit pupil image 300, using the focus detection pixel shown in FIG. 17(c) as an example. In the example shown in the figure, each of the pair of photoelectric conversion units 42a and 42b has a semicircular shape obtained by dividing a circle having a diameter D0 into two equal parts.

FIG. 19(a) shows the relationship between the photoelectric conversion units 42a and 42b of the focus detection pixel and the exit pupil image 300a, for the image height of zero.

Since the substantially circular exit pupil image 300a has a diameter of D0, it covers the entire pair of photoelectric conversion units 42a and 42b.

FIG. 19(b) shows the relationship between, for the first image height H1, the exit pupil image 300b and the photoelectric conversion units 42a and 42b of the focus detection pixel at the position. The exit pupil image 300b has a vertically long substantially elliptical shape, and its major axis MA1 is smaller than the diameter D0. The direction of the minor axis MI1 of the exit pupil image 300b coincides with the placement direction of the pair of photoelectric conversion units 42a and 42b (x-axis direction in FIG. 18), and the minor axis MI1 is smaller than the diameter D0. It is to be noted, the relationship between the exit pupil image 300f at a position point-symmetrical to the exit pupil image 300b with respect to the origin and the photoelectric conversion units 42a and 42b of the focus detection pixel at the position is also the same as in FIG. 19(b).

FIG. 19(c) shows the relationship between, for the second image height H2, the exit pupil image 300B and the photoelectric conversion units 42a and 42b of the focus detection pixel at the position. The exit pupil image 300B has a vertically long substantially elliptical shape smaller than the exit pupil image 300b, and its major axis MA2 and minor axis MI2 are further smaller than the major axis MA1 and minor axis MI1 of the exit pupil image 300b, respectively. It is to be noted, the relationship between the exit pupil image 300F at a position point-symmetrical to the exit pupil image 300B with respect to the origin and the photoelectric conversion units 42a and 42b of the focus detection pixel at the position is also the same as in FIG. 19(c).

FIG. 19(d) shows the relationship, for the first image height H1, between the exit pupil image 300d and the photoelectric conversion units 42a and 42b of the focus detection pixel at the position. The exit pupil image 300d has a horizontally long substantially elliptical shape. The direction of the major axis MA1 of the exit pupil image 300d coincides with the placement direction of the pair of photoelectric conversion units 42a and 42b, and its major axis MA1 is smaller than the diameter D0. It is to be noted, the relationship between the exit pupil image 300h at a position point-symmetrical to the exit pupil image 300d with respect to the origin and the photoelectric conversion units 42a and 42b of the focus detection pixel at the position is also the same as in FIG. 19(d).

FIG. 19(e) shows the relationship, for the second image height H2, between the exit pupil image 300D and the photoelectric conversion units 42a and 42b of the focus detection pixel at the position. The exit pupil image 300D has a horizontally long substantially elliptical shape smaller than the exit pupil image 300d, and its major axis MA2 and minor axis MI2 are further smaller than the major axis MA1 and minor axis MI1 of the exit pupil image 300d, respectively. It is to be noted, the relationship between the exit pupil image 300H at a position point-symmetrical to the exit pupil image 300D with respect to the origin and the photoelectric conversion units 42a and 42b of the focus detection pixel at the position is also the same as in FIG. 19(e).

FIG. 19(f) shows the relationship between the exit pupil images 300c, 300g, 300e, and 300i, for the first image height H1, on the radial direction lines M1 and M2 and the photoelectric conversion units 42a and 42b of the focus detection pixel at that position. The directions of the major axis MA and the minor axis MI of the exit pupil images 300c, 300g, 300e, and 300i are inclined with respect to the placement direction of the pair of photoelectric conversion units 42a and 42b.

FIG. 19(g) shows the relationship between the exit pupil images 300C, 300G, 300E, and 300I for the second image height H2, on the radial direction lines M1 and M2 and the photoelectric conversion units 42a and 42b of the focus detection pixel at that position. The directions of the major axis MA and the minor axis MI of the exit pupil images 300C, 300G, 300E, and 300I are also inclined with respect to the placement direction of the pair of photoelectric conversion units 42a and 42b.

In the first embodiment, it is described that the focus detection unit 215 converts the image shift amount into the defocus amount. This conversion of the image shift amount into the defocus amount will be described below. The conversion formula for converting the image shift amount Δ into the defocus amount Def can be expressed as follows using the conversion coefficient K1.

$$\text{Def} = K1 \times \Delta \qquad (2)$$

The conversion coefficient K1 depends on the gravity center distance between the gravity center position of the overlapping region between the exit pupil images 300a to 300I and the photoelectric conversion unit 42a and the gravity center position of the overlapping region between the exit pupil images 300a to 300I and the photoelectric conversion unit 42b. The conversion coefficient K1 is proportional to the reciprocal of the gravity center distance.

In FIG. 19(a), it is illustrated that the gravity center distance G1 between the gravity center position g1 of the overlapping region between the exit pupil image 300a and the photoelectric conversion unit 42a, and the gravity center position g2 of the overlapping region between the exit pupil image 300a and the photoelectric conversion unit 42b. It is to be noted, the above-mentioned overlapping region between the exit pupil image and the photoelectric conversion unit 42a is a region where the light flux passing through the first pupil region of the exit pupil of the photographing optical system 31 is incident on the photoelectric conversion unit 42a. Similarly, the above-mentioned overlapping region between the exit pupil image and the photoelectric conversion unit 42b is a region where the light flux passing through the second pupil region of the exit pupil of the photographing optical system 31 is incident on the photoelectric conversion unit 42b.

The gravity center distance in the focus detection pixel of the exit pupil image 300b for the first image height H1 shown in FIG. 19(b) is smaller than the gravity center distance in the focus detection pixel of the exit pupil image 300a for the image height zero shown in FIG. 19(a). Therefore, the conversion coefficient K1 of the focus detection pixel shown in FIG. 19(b) is larger than the conversion coefficient K1 of the focus detection pixel shown in FIG. 19(a).

Further, the gravity center distance in the focus detection pixel of the exit pupil image 300B for the second image height H2 shown in FIG. 19(c) is smaller than the gravity center distance in the focus detection pixel of the exit pupil image 300b for the first image height H1 shown in FIG. 19(b). Therefore, the conversion coefficient K1 of the focus detection pixel shown in FIG. 19(c) is larger than the conversion coefficient K1 of the focus detection pixel shown in FIG. 19(b).

The gravity center distance in the focus detection pixel of the exit pupil image 300d for the first image height H1 shown in FIG. 19(d) is smaller than the gravity center distance in the focus detection pixel of the exit pupil image 300a for the image height zero shown in FIG. 19(a). Therefore, the conversion coefficient K1 of the focus detection pixel shown in FIG. 19(d) is larger than the conversion coefficient K1 of the focus detection pixel shown in FIG. 19(a).

Further, the gravity center distance in the focus detection pixel of the exit pupil image 300D for the second image height H2 shown in FIG. 19(e) is smaller than the gravity center distance in the focus detection pixel of the exit pupil image 300d for the first image height H1 shown in FIG. 19(d). Therefore, the conversion coefficient K1 of the focus detection pixel shown in FIG. 19(e) is larger than the conversion coefficient K1 of the focus detection pixel shown in FIG. 19(d).

Each value of the gravity center distance in the focus detection pixels of the exit pupil images 300c, 300g, 300e, and 300i for the first image height H1 shown in FIG. 19(f) is between the value of the gravity center distance in the focus detection pixel shown in FIG. 19(b) and the value of the gravity center distance in the focus detection pixel shown in FIG. 19(d). The value of the conversion coefficient K1 for the focus detection pixel shown in FIG. 19(f) is between the value of the conversion coefficient K1 for the focus detection pixel shown in FIG. 19(b) and the value of the conversion coefficient K1 for the focus detection pixel shown in FIG. 19(d).

Similarly, each value of the gravity center distance in the focus detection pixels of the exit pupil images 300C, 300G, 300E, and 300I for the second image height H2 shown in FIG. 19(g) is between the value of the gravity center distance in the focus detection pixel shown in FIG. 19(c) and the value of the gravity center distance in the focus detection pixel shown in FIG. 19(e). The value of the conversion coefficient K1 for the focus detection pixel shown in FIG. 19(g) is between the value of the conversion coefficient K1 for the focus detection pixel shown in FIG. 19(c) and the value of the conversion coefficient K1 for the focus detection pixel shown in FIG. 19(e). It is to be noted, the gravity center distance for the focus detection pixel in which the major axis and the minor axis of the exit pupil image are inclined with respect to the placement direction of the photoelectric conversion units 42a and 42b is the gravity center distance in the placement direction of the photoelectric conversion units 42a and 42b.

Figure 20:
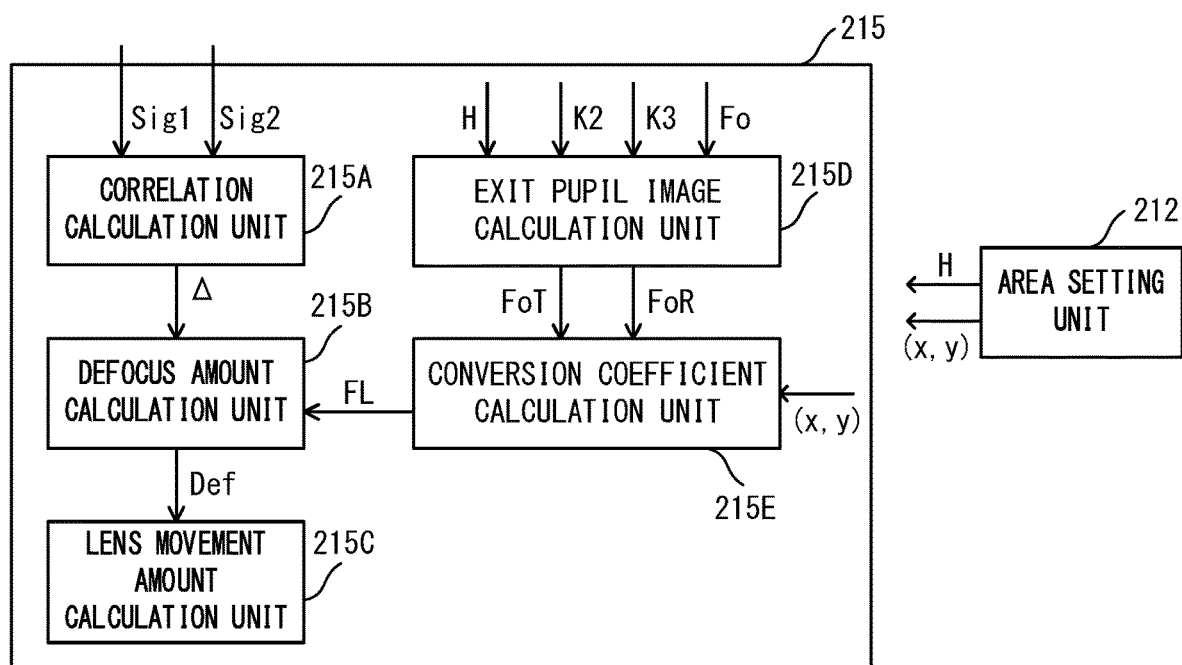
FIG. 20 is a block diagram showing a plurality of functions executed by the focus detection unit, in the imaging device according to the second embodiment in blocks for each function.

Next, a configuration example of the focus detection unit 215 of the camera body 2 according to the second embodiment will be described. FIG. 20 shows a plurality of functions executed by the focus detection unit 215 in blocks for each function. As shown in FIG. 20, the focus detection unit 215 includes a correlation calculation unit 215A, a defocus amount calculation unit 215B, a lens movement amount calculation unit 215C, an exit pupil image calculation unit 215D, and a conversion coefficient calculation unit 215E. Further, the area setting unit 212 sets one focus detection area 100 among the plurality of focus detection areas 100, and outputs the image height H and the coordinates (x, y) with respect to the set focus detection area 100. As described above, the area setting unit 212 outputs the image height for the center of the set focus detection area 100 as the image height H at the set focus detection area 100, and outputs the coordinates of the center of the focus detection area 100 as the coordinates (x, y) of the focus detection area.

The first and second signals Sig1 and Sig2 are input to the correlation calculation unit 215A of the focus detection unit 215, the first and second signals Sig1 and Sig2 are respectively correlation calculated, and the phase difference of the Sig1 and Sig2, that is, the image shift amount Δ is calculated. The defocus amount calculation unit 215B converts the image shift amount Δ into the defocus amount Def by the conversion formula shown as the formula (2), that is, the defocus amount Def is calculated by multiplying the image shift amount Δ by the conversion coefficient K1 which depends on the exit pupil image. The lens movement amount calculation unit 215C calculates the movement amount of the focusing lens 31b based on the defocus amount Def calculated by the defocus amount calculation unit 215B. The lens control unit 32 of the interchangeable lens 3, based on the calculated movement amount of the focusing lens 31b, moves the focusing lens 31b to perform the focus adjustment operation.

To the exit pupil image calculation unit 215D, the image height H with respect to the focus detection area 100 set by the area setting unit 212, the F-number (aperture value) Fo of the aperture 31c transmitted from the interchangeable lens 3, and the coefficients K2, K3, etc., which will be described later, transmitted from the interchangeable lens 3, are input, respectively. The exit pupil image calculation unit 215D stores in advance the calculation formulas (3) and (4) representing the exit pupil images on the concentric circles of the image height H with the image height H as a variable in an internal memory or the like.

$$FoT=(1+K2 \times H^2) \times Fo \quad (3)$$

$$FoR=(1+K3 \times H^2) \times Fo \quad (4)$$

In each of the formulas (3) and (4), Fo is, for example, an open F-number (open aperture value) of the aperture 31c of the photographing optical system 31. The coefficients K2 and K3 of the variable H2 are values determined by the optical characteristics of the photographing optical system 31. These coefficients K2 and K3 are stored in the lens memory 33 of the interchangeable lens 3 and the like, and are transmitted to the camera body 2. Thereby, the camera body 2 acquires information on the coefficients K2 and K3 based on the shape of the exit pupil in the open aperture state, for example, from the interchangeable lens 3. The camera body 2 may acquire from the interchangeable lens 3, information on the coefficients K2 and K3 based on the shape of the exit pupil in a state at where the aperture 31c is stopped down by one step.

FoT in the formula (3) represents the size in the radial direction of the exit pupil image from the center (the optical axis of the photographing optical system 31) of the imaging surface 22a, that is, FoT represents the minor axis MI of the substantially elliptical exit pupil image using the F-number Fo of the aperture 31c of the photographing optical system 31. Similarly, FoR in the formula (4) represents the size in the circumferential direction of the exit pupil image of the circle for the image height H, among concentric circles, that is, FoR represents the major axis MA of the substantially elliptical exit pupil image using the F-number Fo of the aperture 31c of the photographing optical system 31. Since the exit pupil image 300 is the projected image of the exit pupil of the photographing optical system 31, as described above, the shape of the exit pupil image is represented by using the F-number of the aperture 31. The F-number Fo may not be the open F-number of the aperture 31c but may be the F-number of the aperture narrowed down from the open F-number.

In substituting H=0, which means an image height is zero, into formula (3) and (4), FoT which represents the size of the exit pupil image in the radial direction, and FoR which represents the size in the circumferential direction, both become Fo. This represents the shape of the exit pupil image 300a for the image height zero shown in FIG. 18. Further, the formulas (3) and (4) show that as the image height H increases, both FoT which represents the radial size and FoR which represents the circumferential size, of the exit pupil image increase. Formulas (3) and (4) show that as the image height H increases, the major axis MA and the minor axis MI of the exit pupil image 300 decrease as shown in FIG. 18.

As shown in FIG. 20, to the conversion coefficient calculation unit 215E, the image height H and the coordinate values (x, y) of the focus detection area 100 which set by the area setting unit 212, and FoT representing the size in the radial direction and FoR representing the size in the circumferential direction of the exit pupil image which are calculated by the exit pupil image calculation unit 215D are input respectively. The conversion coefficient calculation unit 215E stores in advance the following formula (5) which calculates the length of the exit pupil image 300 in the placement direction (x-axis direction of FIG. 18) of the pair of photoelectric conversion units 42*a* and 42*b* shown in FIG. 19, that is, the conversion coefficient calculation unit 215E stores the formula (5) which calculates FL representing the size in the X axis direction.

$$FL=(FoT \times x^2 + FoR \times y^2)/(x^2+y^2) \quad (5)$$

This FL is expressed using the F-number Fo, and the length of the exit pupil image 300 in the X direction becomes shorter as the FL becomes larger.

For example, substituting the coordinates (xb, 0) of the exit pupil image 300*b* into the formula (5), FL representing the size in the X direction of the exit pupil image 300*b* shown in FIG. 18 becomes FoT which represents the size in the radiation direction. Similarly, for example, substituting the coordinates (0, yd) of the exit pupil image 300*d* into the formula (5), FL representing the size in the X direction of the exit pupil image 300*d* shown in FIG. 18 becomes FoR which represents the size in the radiation direction.

The conversion coefficient calculation unit 215E transmits calculated FL which represents the size in the x-axis direction of exit pupil image 300, as a conversion coefficient, to the defocus amount calculation unit 215B. The defocus amount calculation unit 215B uses $K1 = a \times FL^2 + b$ as the conversion coefficient K1 in the formula (2) to convert the image shift amount Δ into the defocus amount Def. It is to be noted, a and b are constants.

In the above description, as the conversion coefficient K1, FL representing the size in the X direction of the exit pupil image 300 is used instead of the gravity center distance G described with reference to FIG. 19(*a*). This is because the gravity center distance G decreases as FL representing the size in the X direction of the exit pupil image 300 increases.

In order to improve the accuracy of converting the image shift amount into the defocus amount, the gravity center distance can be calculated from FL representing the size, and it is possible to convert into the defocus amount using this gravity center distance.

Figure 21:
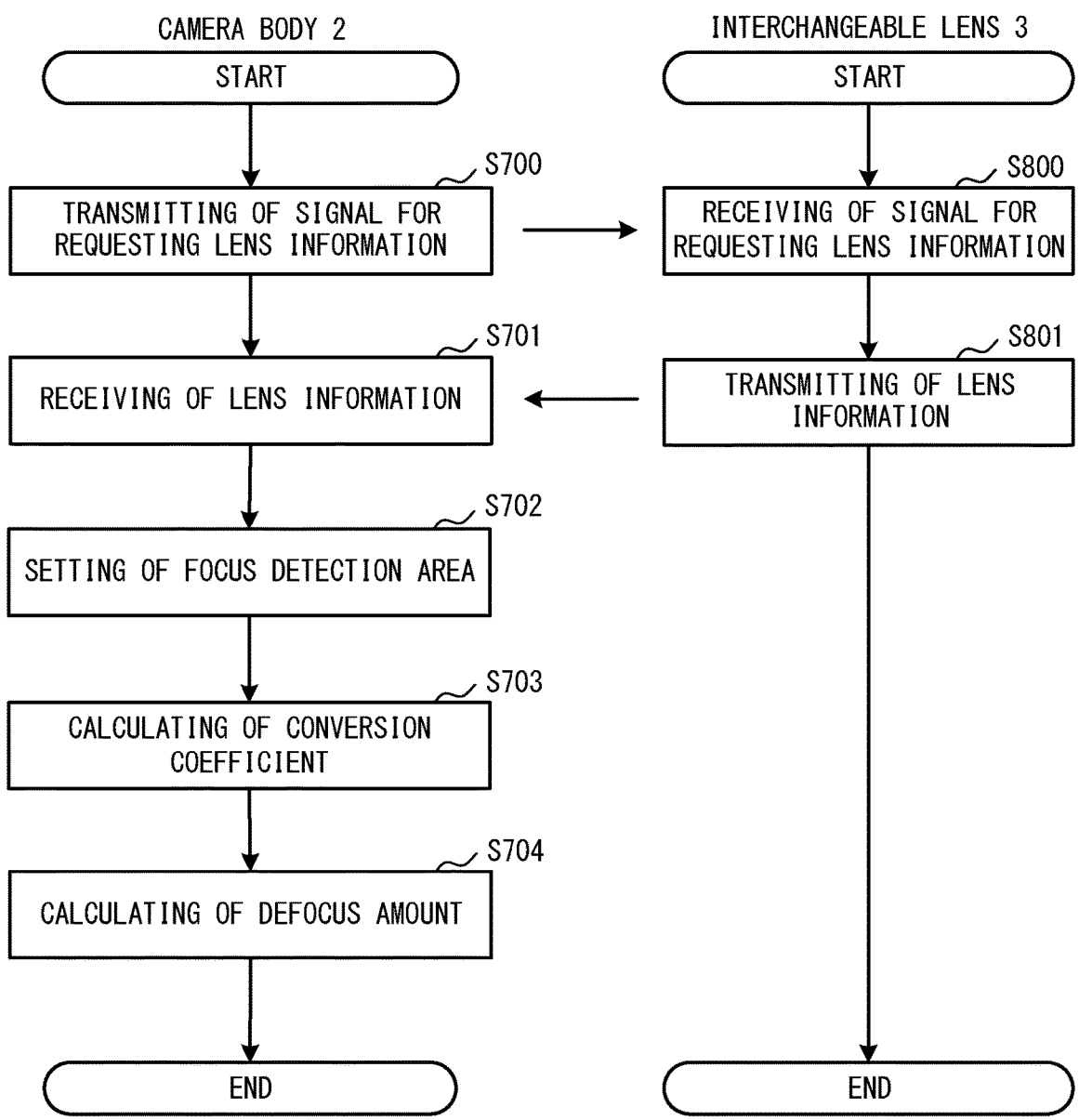
FIG. 21 is a flowchart illustrating an operation in the imaging device according to the second embodiment.

FIG. 21 is a flowchart showing an operation example of converting the image shift amount in the focus detection unit 215 of the camera of the second embodiment into the defocus amount. FIG. 21 shows an operation in a case where the interchangeable lens 3 including the photographing optical system 31 having the optical characteristics that produce exit pupil images 300*a* to 300*i* and 300B to 300I as shown in FIG. 18 is attached to the camera body 2.

In FIG. 21, in step S700, upon being turned on the power, for example, the camera body 2 transmits a signal requesting transmission of lens information to the interchangeable lens 3. In step S800, the interchangeable lens 3 receives the signal requesting the lens information from the camera body 2. In step S801, the interchangeable lens 3 transmits the lens information stored in the lens memory 33 or the like to the camera body 2. The lens information includes the coefficients K2 and K3, and the F-number Fo of the aperture 31*c*. The F-number Fo of the aperture 31*c* is, for example, the open F-number of the aperture 31*c*. In step S701, the camera body 2 receives the lens information from the interchangeable lens 3 and stores the lens information in a memory or the like in the body control unit 210.

In step S702, upon the AF mode being set, the area setting unit 212 of the camera body 2 sets the focus detection area 100 for a predetermined image height H as the area for performing focus detection. The area setting unit 212 outputs the image height H and the coordinates (x, y) of the set focus detection area 100 to the focus detection unit 215.

In step S703, the exit pupil image calculation unit 215D substitutes the image height H of the set focus detection area 100 into the formulas (3) and (4) determined by the coefficients K2, K3, and F-number Fo of the lens information to calculate FoT and FoR. The conversion coefficient calculation unit 215E substitutes, the coordinate values (x, y) of the focus detection area 100 set by the area setting unit 212 and FoT and FoR calculated by the exit pupil image calculation unit 215D into the formula (5) to calculate FL representing the size of the exit pupil image 300 in the placement direction (X-axis direction of FIG. 18) of the pair of photoelectric conversion units 42*a* and 42*b*. The conversion coefficient calculation unit 215E transmits calculated FL which represents the size in X direction of the exit pupil image 300, as a conversion coefficient to the defocus amount calculation unit 215B.

In step S704, the defocus amount calculation unit 215B converts the image shift amount Δ into the defocus amount Def by using $K1 = a \times FL^2 + b$ as the conversion coefficient K1 of the formula (2).

In a case where the F-number of the aperture 31*c* at the time of focus detection is changed or the focus detection area is changed, the camera 1 repeats a series of operations of step S801 and steps S701 to S704.

It is to be noted, in a case where the interchangeable lens 3 has both the optical characteristics described with reference to FIG. 9 in the first embodiment and the optical characteristics described with reference to FIG. 18 in the second embodiment, the operations described in the first and second embodiments are performed.

According to the above-described embodiment, the following effects can be obtained.

(1) To the input unit (the body control unit 210), the second information regarding the shape of the exit pupil of the optical system is input, and the focus detection unit 215 performs focus detection based on the second information and the signal which is output from the first pixel or from the second pixel. In the present embodiment, information (K2, K3) regarding the shape of the exit pupil is input from the interchangeable lens 3 to the body control unit 210. The body control unit 210 calculates the size of the exit pupil image for the image height in the focus detection area and multiplies the calculated conversion coefficient depending on the exit pupil distance by the image shift amount to calculate the defocus amount. The camera 1 changes the conversion coefficient used for calculating the defocus amount according to the exit pupil image that changes in one interchangeable lens 3 or the exit pupil image that changes by replacing the interchangeable lens 3. Thereby, the camera 1 can perform highly accurate focus detection even if the exit pupil image changes. As a result, it is possible to suppress a decrease in focus detection accuracy.

Variation 8

In the second embodiment, the sizes in the radial direction of the exit pupil images 300*a* to 300*i* and 300B to 300I, that is, the minor axis MI of the substantially elliptical exit pupil images are expressed by the equation (3) using the F-number of the aperture 31c. Similarly, the sizes in the circumferential direction of the exit pupil images 300a to 300i and 300B to 300I, that is, the major axis MA of the substantially elliptical exit pupil images are expressed by the formula (4) which uses the F-number of the aperture 31c. Instead of this F-number of the aperture 31c, the minor axis MI and the major axis MA of the exit pupil image may be represented by using the aperture diameter of the aperture 31c.

Variation 9

In the second embodiment, the exit pupil image calculation unit 215D calculates FoT and FoR by using the image height H and the coefficients K2, K3 and the F-number Fo, and the conversion coefficient calculation unit 215E calculates FL by using FoT and FoR and the coordinates (x, y). In the present variation, the exit pupil image calculation unit 215D is omitted, and the conversion coefficient calculation unit 215E directly calculates FL by using the coefficients K2, K3, the F-number Fo, and the coordinates (x, y). This will be described below.

Substituting FoT of the formula (3) and FoR of the formula (4) into FoT and FoR of the above formula (5) gives the following formula (6).

$$FL=\{(1+K2\times H^2)Fo\times x^2+(1+K3\times H^2)Fo\times y^2\}/(x^2+y^2) \quad (6)$$

Regarding the image height H of the focus detection area 100 set by the area setting unit 212 and the coordinates (x, y) of the focus detection area, $H^2=x^2+y^2$ is established. By substituting this $H^2=x^2+y^2$ to $H^2$ in the formula (6), FL can be expressed by the following formula (7).

$$FL=\{(1+K2(x^2+y^2))Fo\times x^2+(1+K3(x^2+y^2))Fo\times y^2\}/(x^2+y^2) \quad (7)$$

The conversion coefficient calculation unit 215E according to the present variation uses the coefficients K2, K3 and F-number Fo transmitted from the interchangeable lens 3 and the coordinate values (x, y) from the area setting unit 212, to calculate FL based on the formula (7).

It is to be noted, the method for obtaining FoT and FoR is not limited to the method using the above-mentioned formulas (3) and (4). Calculation formulas other than the formulas (3) and (4) may also be used. A table showing the relationship between the image height and FoT and FoR may also be used.

Further, the method for calculating FL is not limited to the method using the above-mentioned formulas (5) and (6). Calculation formulas other than the formulas (5) and (6) may also be used. A table showing the relationship between the coordinates (x, y) and the F-numbers Fo, FL may also be used.

The following variations are also within the scope of the present invention, and one or more of the variations can be combined with the above-described embodiment.

Variation 10

Figure 22:
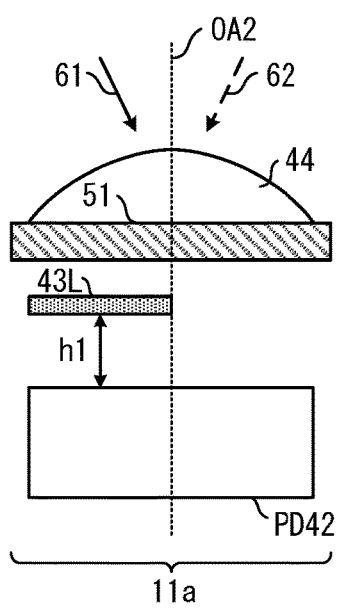
FIG. 22 is a diagram showing a configuration example of focus detection pixels in the imaging device according to one variation.
Figure 22:
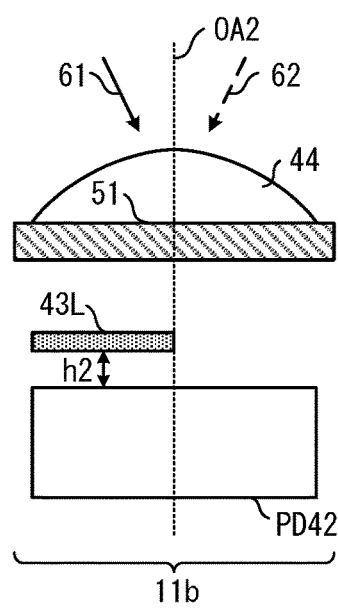
Figure 22:
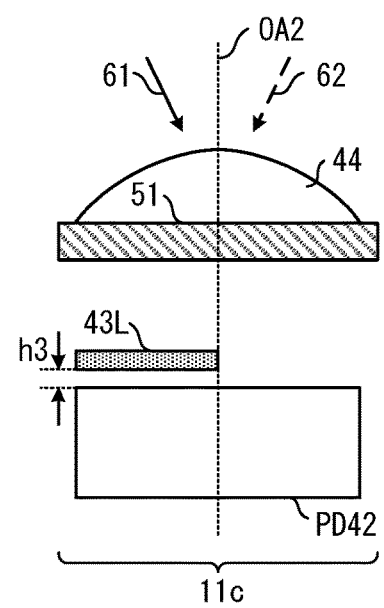

In the above-described embodiment, an example in which first to third AF pixel pairs having different deviation amounts are arranged on the image sensor 22 as a plurality of types of AF pixel pairs has been described. However, a plurality of types of AF pixel pairs having different arrangement positions of the light-shielding portions between the color filter 51 and the photoelectric conversion unit 42 may be arranged on the image sensor 22. FIG. 22 is a diagram showing a configuration example of a focus detection pixel of the image sensor 22 according to the present variation. In the figure, the same reference signs are assigned to the same or corresponding parts as those in the above-described embodiment.

The light-shielding portion 43L of the first focus detection pixel 11a is provided, between the color filter 51 and the photoelectric conversion unit 42, with a predetermined distance h1 from the photoelectric conversion unit 42. The light-shielding portion 43L of the first focus detection pixel 11b is provided, between the color filter 51 and the photoelectric conversion unit 42, with a predetermined distance h2 from the photoelectric conversion unit 42. The light-shielding portion 43L of the first focus detection pixel 11c is provided, between the color filter 51 and the photoelectric conversion unit 42, with a predetermined distance h3 from the photoelectric conversion unit 42. The distance h2 is smaller than the distance h1 and larger than the distance h3. That is, h1>h2>h3. As described above, the positions of the light-shielding portions 43L are different in the first focus detection pixels 11a, 11b, and 11c to each other. Further, in the second focus detection pixels 12a, 12b, 12c constituting each AF pixel pair, the arrangement positions of the light-shielding portions 43R are different from each other. Thereby, the first to third AF pixel pairs can perform pupil division corresponding to different incident angles, as in the case of the above-described embodiment.

Variation 11

Figure 23:
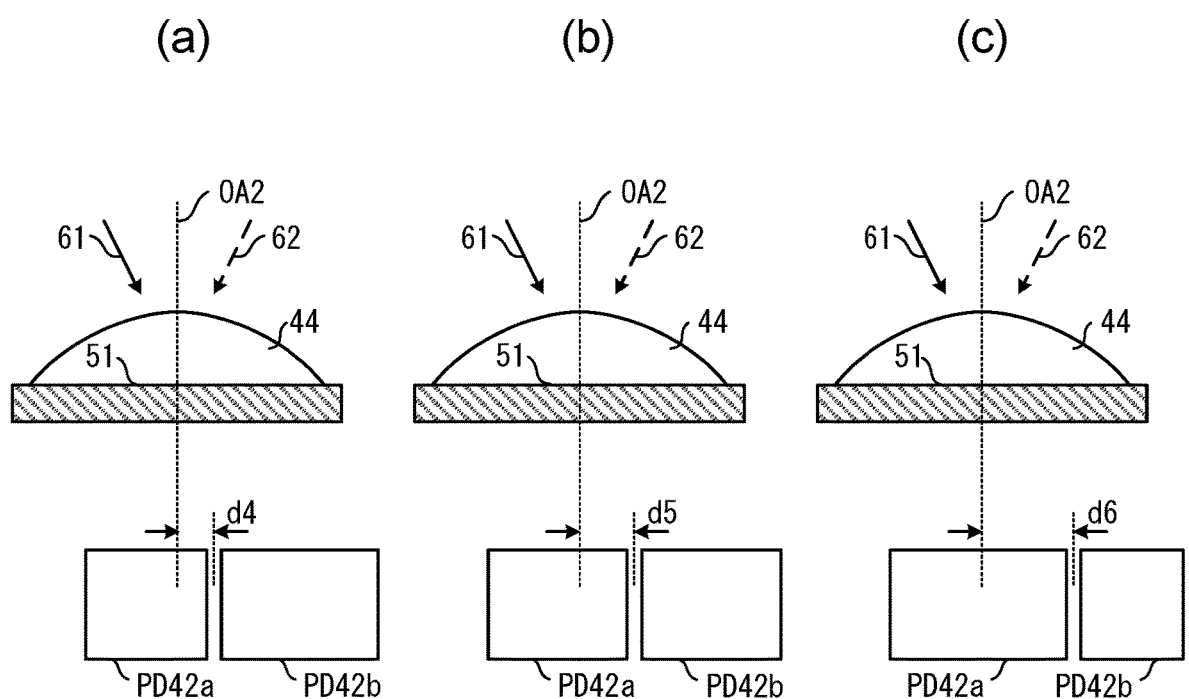
FIG. 23 is a diagram showing a configuration example of focus detection pixels in the imaging device according to one variation.

FIG. 23 is a diagram showing a configuration example of a focus detection pixel of the image sensor 22 according to the present variation. As an example, FIG. 23 shows a cross-sectional view of a part of three types of AF pixel pairs in the focus detection area 100c shown in FIG. 2. In the figure, the same reference signs are assigned to the same or corresponding parts as those in the above-described embodiment. Each of the three types of focus detection pixels shown in FIG. 23(a) to FIG. 23(c) includes a microlens 44, and a first and second photoelectric conversion units 42a and 42b each of which photoelectrically convert the light transmitted through the microlens 44. In the present variation, the light receiving areas, of a first photoelectric conversion units 42a and a second photoelectric conversion unit 42b are different from each other in the first to third AF pixel pair. In this case as well, the first to third AF pixel pairs can perform pupil division corresponding to different incident angles, as in the case of the above-described embodiment.

Variation 12

The selection unit 214 may select a plurality of types of AF pixel pairs. In this case, the focus detection unit 215 may calculate a plurality of defocus amounts using the first and second signals output respectively from the plurality of types of AF pixel pairs, respectively, and the movement amount of the focusing lens 31b may be calculated based on the average value of the defocus amounts. For example, the defocus amount of the focusing lens 31b may be determined based on the average value of the defocus amounts calculated using the first and second signals Sig1 and Sig2 of the first AF pixel pair and the first and second signals Sig1 and Sig2 of the second AF pixel pair.

Variation 13

In the above-described embodiment, the case where the primary color system (RGB) color filter is used for the image sensor 22 has been described, but the complementary color system (CMY) color filter may be used.

Variation 14

The imaging device described in the above-described embodiment and variations may be applied to a camera, a smartphone, a tablet, a camera built in a PC, an in-vehicle camera, a camera mounted on an unmanned aerial vehicle (drone, radio-controlled model, etc.), etc.

Although various embodiments and variations have been described above, the present invention is not limited to these contents. Other aspects conceivable within the scope of the technical idea of the present invention are also included within the scope of the present invention.

The disclosure of the following priority application is herein incorporated by reference: Japanese Patent Application No. 2018-137262 filed Jul. 20, 2018.

REFERENCE SIGNS LIST

| | | |
|---|---|---|
| 1 Imaging Device, | 2 Camera Body, | 3 Interchangeable Lens, |
| 11 Focus Detection Pixel, | 12 Focus Detection Pixel, | |
| 13 Imaging Pixel, | 22 Image Sensor, | 23 Body Memory, |
| 31 Photographing Optical System, | 31a Zoom Lens, | |
| 31b Focusing Lens, | 31c Aperture, | 32 Lens Control Unit, |
| 33 Lens Memory, | 42 Photoelectric Conversion Unit, | 44 Microlens, |
| 210 Body Control Unit, | 211 Image Data Generation Unit, | |
| 212 Area Setting Unit, | 213 Distance Calculation Unit, | |
| 214 Selection Unit, | 215 Focus Detection Unit. | |

The invention claimed is:

1. An image sensor comprising:
   a first pixel and a second pixel that receive light transmitted through an optical system and output a signal used for focus detection; and
   an output unit that outputs a signal from the first pixel or the second pixel selected based on first information regarding (i) a position on an image plane and (ii) an exit pupil distance of the optical system.

2. The image sensor according to claim 1, further comprising:
   a plurality of the first pixels and a plurality of the second pixels; and
   a plurality of focus detection areas each having a said first pixel and a said second pixel, wherein
   the output unit outputs the signal from the first pixel or the second pixel selected based on (i) a position of the focus detection areas and (ii) the first information.

3. The image sensor according to claim 2, wherein:
   the output unit outputs the signal from the selected first or second pixel in the plurality of focus detection areas.

4. The image sensor according to claim 3, wherein:
   (i) in a case in which the first pixel is selected in one of the focus detection areas, the output unit outputs the signal from the first pixel in another of the focus detection areas, and (ii) in a case in which the second pixel is selected in one of the focus detection areas, the output unit outputs the signal from the second pixel in another of the focus detection areas.

5. The image sensor according to claim 2, wherein:
   the output unit outputs the signal from the first pixel or the second pixel selected based on (i) the position of the focus detection area farthest from an optical axis among the plurality of focus detection areas and (ii) the first information.

6. The image sensor according to claim 5, wherein:
   (i) in a case in which the first pixel is selected at the position of the focus detection area farthest from the optical axis among the plurality of focus detection areas, the output unit outputs the signal from the first pixel in another of the focus detection areas, and (ii) in a case in which the second pixel is selected at the position of the focus detection area farthest from the optical axis among the plurality of focus detection areas, the output unit outputs the signal from the second pixel in another of the focus detection areas.

7. The image sensor according to claim 2, wherein:
   the plurality of focus detection areas has (i) a first focus detection area and (ii) a second focus detection area that is farther from an optical axis than the first focus detection area; and
   the output unit outputs the signal from the first pixel or the second pixel selected based on (i) the position of the second focus detection area and (ii) the first information.

8. The image sensor according to claim 7, wherein:
   (i) in a case in which the first pixel is selected in the second focus detection area, the output unit outputs the signal from the first pixel in the first focus detection area, and (ii) in a case in which the second pixel is selected in the second focus detection area, the output unit outputs the signal from the second pixel in the first focus detection area.

9. The image sensor according to claim 2, wherein:
   the output unit outputs the signal from the first pixel or the second pixel based on (i) the position of the focus detection area selected by a selection unit that can select any of the focus detection areas from the plurality of focus detection areas and (ii) the first information.

10. The image sensor according to claim 1, wherein:
    the output unit outputs the signal from the first pixel or the second pixel selected based on (i) at least one of a focal length and a photographing distance of the optical system and (ii) the first information.

11. The image sensor according to claim 1, wherein:
    the output unit outputs the signal from the first pixel or the second pixel selected based on the first information when at least one of a focal length and a photographing distance of the optical system changes.

12. The image sensor according to claim 1, wherein:
    the first information is information regarding the exit pupil distance that changes depending on the position on the image plane.

13. The image sensor according to claim 1, wherein:
    the first information is (i) information indicating a relationship between the position on the image plane and the exit pupil distance or (ii) a coefficient of a formula for calculating the exit pupil distance.

14. The image sensor according to claim 1, further comprising:
a plurality of the first pixels; and
a plurality of the second pixels, wherein:
the plurality of the first pixels includes a pixel that receives light transmitted through a first pupil region of the optical system and a pixel that receives light transmitted through a second pupil region different from the first pupil region; and
the plurality of the second pixels includes a pixel that receives light transmitted through the first pupil region and a pixel that receives light transmitted through the second pupil region.

15. The image sensor according to claim 1, wherein:
each of the first pixel and the second pixel has a photoelectric converter; and
an area in which the photoelectric converter of the first pixel receives light is different from an area in which the photoelectric converter of the second pixel receives light.

16. An imaging device, comprising:
the image sensor according to claim 1; and
a generation unit that generates image data based on the signal output from the image sensor.

17. An image sensor comprising:
a first pixel and a second pixel that receive light transmitted through an optical system and output a signal used for focus detection; and
an output unit that selects the first pixel or the second pixel based on first information regarding (i) a position on an image plane and (ii) an exit pupil distance of the optical system and that outputs a signal from the selected first or second pixel.

18. The image sensor according to claim 17, further comprising:
a plurality of the first pixels and a plurality of the second pixels; and
a plurality of focus detection areas each having a said first pixel and a said second pixel, wherein:
the output unit selects the first pixel or the second pixel based on (i) the position of the focus detection area and (ii) the first information, and the output unit outputs the signal from the selected first or second pixel.

19. The image sensor according to claim 18, wherein:
the output unit selects, in the plurality of focus detection areas, the first pixel or the second pixel and outputs the signal from the selected first or second pixel.

20. The image sensor according to claim 19, wherein:
(i) in a case in which the output unit selects the first pixel in one of the focus detection areas, the output unit outputs the signal from the first pixel in another of the focus detection areas, and (ii) in a case in which the output unit selects the second pixel in one of the focus detection areas, the output unit outputs the signal from the second pixel in another of the focus detection areas.

21. The image sensor according to claim 18, wherein:
the output unit (i) selects the first pixel or the second pixel based on (a) the position of the focus detection area farthest from an optical axis among the plurality of focus detection areas and (b) the first information, and the output unit outputs the signal from the selected first or second pixel.

22. The image sensor according to claim 21, wherein:
(i) in a case in which the output unit selects the first pixel at the position of the focus detection area farthest from the optical axis among the plurality of focus detection areas, the output unit outputs the signal from the first pixel in another of the focus detection areas, and (ii) in a case in which the output unit selects the second pixel at the position of the focus detection area farthest from the optical axis, the output unit outputs the signal from the second pixel in another of the focus detection areas.

23. The image sensor according to claim 18, wherein:
the plurality of focus detection areas has (i) a first focus detection area and (ii) a second focus detection area that is farther from an optical axis than the first focus detection area; and
the output unit selects the first pixel or the second pixel based on (i) the position of the second focus detection area and (ii) the first information, and the output unit outputs the signal from the selected first or second pixel.

24. The image sensor according to claim 23, wherein:
(i) in a case in which the output unit selects the first pixel in the second focus detection area, the output unit outputs the signal from the first pixel in the first focus detection area, and (ii) in a case in which the output unit selects the second pixel in the second focus detection area, the output unit outputs the signal from the second pixel in the first focus detection area.

25. The image sensor according to claim 18, wherein:
the output unit (i) selects the first pixel or the second pixel based on (a) the position of the focus detection area selected by a selection unit that can select any of the focus detection areas from the plurality of focus detection areas and (b) the first information, and the output unit (ii) outputs the signal from the selected first or second pixel.

26. The image sensor according to claim 17, wherein:
the output unit (i) selects the first pixel or the second pixel based on (a) at least one of a focal length and a photographing distance of the optical system and (b) the first information, and the output unit (ii) outputs the signal from the selected first or second pixel.

27. The image sensor according to claim 17, wherein:
when at least one of a focal length and a photographing distance of the optical system changes, the output unit selects the first pixel or the second pixel based on the first information and outputs a signal from the selected first or second pixel.

28. The image sensor according to claim 17, wherein:
the first information is information regarding the exit pupil distance that changes depending on the position on the image plane.

29. The image sensor according to claim 17, wherein:
the first information is (i) information indicating a relationship between the position on the image plane and the exit pupil distance or (ii) a coefficient of a formula for calculating the exit pupil distance.

30. The image sensor according to claim 17, comprising:
a plurality of the first pixels; and
a plurality of the second pixels, wherein:
the plurality of the first pixels includes a pixel that receives light transmitted through a first pupil region of the optical system and a pixel that receives light transmitted through a second pupil region different from the first pupil region; and
the plurality of the second pixels includes a pixel that receives light transmitted through the first pupil region and a pixel that receives light transmitted through the second pupil region.

31. The image sensor according to claim 17, wherein:
- each of the first pixel and the second pixel has a photoelectric converter; and
- an area in which the photoelectric converter of the first pixel receives light is different from an area in which the photoelectric converter of the second pixel receives light.

32. An imaging device, comprising:
- the image sensor according to claim 17; and
- a generation unit that generates image data based on the signal output from the image sensor.

* * * * *